US012578779B2

(12) United States Patent　　　　　(10) Patent No.:　US 12,578,779 B2
D'Amato et al.　　　　　　　　　　(45) Date of Patent:　　*Mar. 17, 2026

(54) MULTIPLE STAGE NETWORK MICROPHONE DEVICE WITH REDUCED POWER CONSUMPTION AND PROCESSING LOAD

(71) Applicant: Sonos, Inc., Santa Barbara, CA (US)

(72) Inventors: Nick D'Amato, Santa Barbara, CA (US); Daniele Giacobello, Los Angeles, CA (US); Joachim Fainberg, Santa Barbara, CA (US); Klaus Hartung, Santa Barbara, CA (US)

(73) Assignee: Sonos, Inc., Goleta, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/395,386

(22) Filed: Dec. 22, 2023

(65) Prior Publication Data

US 2024/0288926 A1　　Aug. 29, 2024

Related U.S. Application Data

(63) Continuation of application No. 16/168,389, filed on Oct. 23, 2018, now Pat. No. 11,899,519.

(51) Int. Cl.
*G10L 15/22*　　　　(2006.01)
*G06F 1/3231*　　　(2019.01)
(Continued)

(52) U.S. Cl.
CPC .......... *G06F 1/3287* (2013.01); *G06F 1/3231* (2013.01); *G06F 3/167* (2013.01); *H04R 3/00* (2013.01)

(58) Field of Classification Search
CPC .............. G10L 15/22; G10L 2015/088; G10L 2015/223; G10L 15/26; G10L 15/30;
(Continued)

(56) References Cited

U.S. PATENT DOCUMENTS 6,704,671 B1　　3/2004　Umminger, III
8,489,398 B1　　7/2013　Gruenstein
(Continued)

FOREIGN PATENT DOCUMENTS

CN　　101569093 A　　10/2009
CN　　104155938 A　　11/2014
(Continued)

OTHER PUBLICATIONS

Notice of Allowance mailed on Mar. 13, 2024, issued in connection with U.S. Appl. No. 18/449,254, filed Aug. 14, 2023, 10 pages.
(Continued)

*Primary Examiner* — Olujimi A Adesanya
(74) *Attorney, Agent, or Firm* — Akerman LLP

(57)　　　　ABSTRACT

Systems, methods, and devices with reduced power consumption in network microphone devices. In one embodiment, a network microphone device is configured to perform a method that includes (i) capturing audio content; (ii) using a first algorithm to perform a keyword detection process for determining whether the audio content includes a keyword; (iii) responsive to determining that the audio content includes the keyword, using a second, more computationally intensive algorithm to perform a wake-word detection process for determining whether the audio content includes a wake word; and (iv) responsive to performing the wake-word detection process, (a) causing a voice service corresponding to the wake word to process the audio content if the wake-word detection process confirms that the audio content includes the wake word or (b) ceasing performance of the wake-word detection process if the wake-word detection process disconfirms that the audio content includes the wake word.

20 Claims, 12 Drawing Sheets

(51) Int. Cl.

| | |
|---|---|
| *G06F 1/3287* | (2019.01) |
| *G06F 3/16* | (2006.01) |
| *G10L 15/08* | (2006.01) |
| *G10L 15/26* | (2006.01) |
| *G10L 15/30* | (2013.01) |
| *G10L 15/32* | (2013.01) |
| *H04R 3/00* | (2006.01) |

(58) Field of Classification Search

CPC ....... G10L 25/78; G10L 15/063; G10L 17/00; G10L 15/00

See application file for complete search history.

(56) References Cited

U.S. PATENT DOCUMENTS

| | | | |
|---|---|---|---|
| 8,566,722 | B2 | 10/2013 | Gordon et al. |
| 8,676,273 | B1 | 3/2014 | Fujisaki |
| 8,719,039 | B1 | 5/2014 | Sharifi |
| 8,768,712 | B1 | 7/2014 | Sharifi |
| 8,798,995 | B1 | 8/2014 | Edara |
| 8,898,063 | B1 | 11/2014 | Sykes et al. |
| 9,226,088 | B2 | 12/2015 | Pandey et al. |
| 9,263,042 | B1 | 2/2016 | Sharifi |
| 9,491,033 | B1 | 11/2016 | Soyannwo et al. |
| 9,542,941 | B1 | 1/2017 | Weksler et al. |
| 9,779,735 | B2 | 10/2017 | Civelli et al. |
| 9,940,930 | B1 | 4/2018 | Campbell et al. |
| 9,997,151 | B1 | 6/2018 | Ayrapetian et al. |
| 10,038,419 | B1 | 7/2018 | Elliot et al. |
| 10,127,908 | B1 | 11/2018 | Deller et al. |
| 10,157,042 | B1 | 12/2018 | Jayakumar et al. |
| 10,204,624 | B1 | 2/2019 | Knudson et al. |
| 10,304,475 | B1* | 5/2019 | Wang ........................ G01S 3/80 |
| 10,332,508 | B1 | 6/2019 | Hoffmeister |
| 10,366,699 | B1 | 7/2019 | Dharia et al. |
| 10,482,899 | B2 | 11/2019 | Ramprashad et al. |
| 10,510,362 | B2 | 12/2019 | Hicks et al. |
| 10,565,999 | B2 | 2/2020 | Wilberding |
| 10,567,515 | B1 | 2/2020 | Bao |
| 10,720,173 | B2 | 7/2020 | Freeman et al. |
| 10,735,870 | B2 | 8/2020 | Ballande et al. |
| 10,746,840 | B1 | 8/2020 | Barton et al. |
| 10,789,041 | B2 | 9/2020 | Kim et al. |
| 10,847,164 | B2 | 11/2020 | Wilberding |
| 10,871,943 | B1 | 12/2020 | D'Amato |
| 10,878,811 | B2 | 12/2020 | Smith et al. |
| 10,885,091 | B1 | 1/2021 | Meng et al. |
| 11,025,569 | B2 | 6/2021 | Lind et al. |
| 11,095,978 | B2 | 8/2021 | Gigandet et al. |
| 11,138,969 | B2 | 10/2021 | D'Amato |
| 11,140,494 | B2 | 10/2021 | Pedersen et al. |
| 11,184,969 | B2 | 11/2021 | Lang |
| 11,189,284 | B2 | 11/2021 | Maeng |
| 11,354,092 | B2 | 6/2022 | D'Amato |
| 11,373,645 | B1 | 6/2022 | Mathew et al. |
| 11,475,899 | B2 | 10/2022 | Lesso |
| 11,531,520 | B2 | 12/2022 | Wilberding |
| 11,532,306 | B2 | 12/2022 | Kim et al. |
| 11,580,969 | B2 | 2/2023 | Han et al. |
| 11,646,023 | B2 | 5/2023 | Smith |
| 11,664,023 | B2 | 5/2023 | Reilly |
| 11,694,689 | B2 | 7/2023 | Smith |
| 11,709,653 | B1 | 7/2023 | Shin |
| 11,714,600 | B2 | 8/2023 | D'Amato |
| 11,727,936 | B2 | 8/2023 | Smith |
| 11,769,505 | B2 | 9/2023 | Sereshki |
| 11,790,937 | B2 | 10/2023 | Smith et al. |
| 11,817,076 | B2 | 11/2023 | Sereshki et al. |
| 2003/0097482 | A1 | 5/2003 | DeHart et al. |
| 2005/0131558 | A1 | 6/2005 | Braithwaite et al. |
| 2006/0104454 | A1 | 5/2006 | Guitarte Perez et al. |
| 2006/0161964 | A1 | 7/2006 | Chung |
| 2007/0038461 | A1 | 2/2007 | Abbott et al. |
| 2013/0171930 | A1 | 7/2013 | Anand et al. |
| 2013/0185639 | A1 | 7/2013 | Lim |
| 2013/0322634 | A1 | 12/2013 | Bennett et al. |
| 2014/0122092 | A1 | 5/2014 | Goldstein |
| 2014/0167929 | A1 | 6/2014 | Shim et al. |
| 2014/0181199 | A1 | 6/2014 | Kumar et al. |
| 2014/0229184 | A1 | 8/2014 | Shires |
| 2014/0253676 | A1 | 9/2014 | Nagase et al. |
| 2014/0364089 | A1 | 12/2014 | Lienhart et al. |
| 2015/0112689 | A1 | 4/2015 | Nandy et al. |
| 2015/0154954 | A1 | 6/2015 | Sharifi |
| 2015/0161989 | A1* | 6/2015 | Hsu ........................ G10L 15/08 |
| | | | 704/251 |
| 2015/0215382 | A1 | 7/2015 | Arora et al. |
| 2015/0245154 | A1 | 8/2015 | Dadu et al. |
| 2015/0248885 | A1 | 9/2015 | Koulomzin |
| 2015/0279351 | A1 | 10/2015 | Nguyen et al. |
| 2015/0356968 | A1 | 12/2015 | Rice et al. |
| 2016/0014536 | A1 | 1/2016 | Sheen |
| 2016/0018873 | A1 | 1/2016 | Fernald et al. |
| 2016/0055847 | A1* | 2/2016 | Dahan ..................... G10L 15/22 |
| | | | 704/275 |
| 2016/0078864 | A1 | 3/2016 | Palanisamy et al. |
| 2016/0118048 | A1 | 4/2016 | Heide |
| 2016/0134966 | A1 | 5/2016 | Fitzgerald et al. |
| 2016/0240192 | A1 | 8/2016 | Raghuvir |
| 2016/0322045 | A1 | 11/2016 | Hatfield et al. |
| 2016/0335485 | A1 | 11/2016 | Kim |
| 2016/0379635 | A1* | 12/2016 | Page ........................ G10L 15/22 |
| | | | 704/251 |
| 2017/0186427 | A1 | 6/2017 | Wang et al. |
| 2017/0270919 | A1* | 9/2017 | Parthasarathi .......... G10L 17/06 |
| 2017/0332035 | A1 | 11/2017 | Shah et al. |
| 2017/0337932 | A1 | 11/2017 | Iyengar et al. |
| 2018/0061396 | A1* | 3/2018 | Srinivasan ............ G10L 15/005 |
| 2018/0120947 | A1 | 5/2018 | Wells et al. |
| 2018/0122372 | A1 | 5/2018 | Wanderlust |
| 2018/0158454 | A1 | 6/2018 | Campbell et al. |
| 2018/0270575 | A1 | 9/2018 | Akutagawa |
| 2018/0301147 | A1 | 10/2018 | Kim |
| 2018/0330589 | A1 | 11/2018 | Horling |
| 2018/0330727 | A1 | 11/2018 | Tulli |
| 2018/0352014 | A1 | 12/2018 | Alsina et al. |
| 2019/0013021 | A1* | 1/2019 | Chang ..................... G06F 40/30 |
| 2019/0044745 | A1 | 2/2019 | Knudson et al. |
| 2019/0051299 | A1 | 2/2019 | Ossowski et al. |
| 2019/0066680 | A1 | 2/2019 | Woo et al. |
| 2019/0066687 | A1 | 2/2019 | Wood et al. |
| 2019/0147860 | A1 | 5/2019 | Chen et al. |
| 2019/0147905 | A1* | 5/2019 | Mai ........................ G06F 1/3234 |
| | | | 704/275 |
| 2019/0179611 | A1 | 6/2019 | Wojogbe et al. |
| 2019/0207777 | A1* | 7/2019 | Patel ........................ H04L 49/90 |
| 2019/0251960 | A1* | 8/2019 | Maker ................ G10L 21/0316 |
| 2019/0259408 | A1 | 8/2019 | Freeman et al. |
| 2019/0281387 | A1 | 9/2019 | Woo et al. |
| 2019/0371310 | A1 | 12/2019 | Fox et al. |
| 2019/0371329 | A1 | 12/2019 | D'Souza et al. |
| 2020/0043494 | A1 | 2/2020 | Maeng |
| 2020/0066279 | A1 | 2/2020 | Kang et al. |
| 2020/0075018 | A1 | 3/2020 | Chen |
| 2020/0089469 | A1 | 3/2020 | Wilberding et al. |
| 2020/0105256 | A1* | 4/2020 | Fainberg ................ G10L 15/30 |
| 2020/0167597 | A1 | 5/2020 | Nguyen et al. |
| 2020/0265842 | A1 | 8/2020 | Singh |
| 2020/0364026 | A1 | 11/2020 | Lee et al. |
| 2021/0029452 | A1 | 1/2021 | Tsoi et al. |
| 2021/0055778 | A1* | 2/2021 | Myer .................. G06N 3/0495 |
| 2021/0134280 | A1 | 5/2021 | Kurtz |
| 2021/0157542 | A1 | 5/2021 | De Assis et al. |
| 2021/0239831 | A1 | 8/2021 | Shin et al. |
| 2021/0249004 | A1 | 8/2021 | Smith |
| 2021/0358481 | A1 | 11/2021 | D'Amato et al. |
| 2022/0035514 | A1 | 2/2022 | Shin et al. |
| 2022/0044670 | A1* | 2/2022 | Shim ..................... H04R 3/005 |
| 2023/0019595 | A1 | 1/2023 | Smith |
| 2023/0215433 | A1 | 7/2023 | Myers et al. |
| 2023/0237998 | A1 | 7/2023 | Smith et al. |
| 2023/0274738 | A1 | 8/2023 | Smith et al. |
| 2023/0382349 | A1 | 11/2023 | Ham |

(56)                    References Cited

U.S. PATENT DOCUMENTS

FOREIGN PATENT DOCUMENTS

| CN | 104581510  | A  | 4/2015  |
|----|------------|----|---------|
| CN | 105101083  | A  | 11/2015 |
| EP | 3142107    | A1 | 3/2017  |
| JP | 2004096520 | A  | 3/2004  |
| JP | 2019109510 | A  | 7/2019  |
| KR | 101284134  | B1 | 7/2013  |
| WO | 9731437    | A1 | 8/1997  |
| WO | 2016014686 |    | 1/2016  |
| WO | 2018064362 | A1 | 4/2018  |
| WO | 2020061439 | A1 | 3/2020  |
| WO | 2020068795 | A1 | 4/2020  |
| WO | 2020132298 | A1 | 6/2020  |

OTHER PUBLICATIONS

Notice of Allowance mailed on Aug. 14, 2023, issued in connection with U.S. Appl. No. 17/549,034, filed Dec. 13, 2021, 9 pages.
Notice of Allowance mailed on Dec. 14, 2023, issued in connection with U.S. Appl. No. 17/722,661, filed Apr. 18, 2022, 12 pages.
Notice of Allowance mailed on Sep. 14, 2023, issued in connection with U.S. Appl. No. 18/061,579, filed Dec. 5, 2022, 7 pages.
Notice of Allowance mailed on Dec. 15, 2023, issued in connection with U.S. Appl. No. 18/157,937, filed Jan. 23, 2023, 8 pages.
Notice of Allowance mailed on Jun. 15, 2023, issued in connection with U.S. Appl. No. 17/305,698, filed Jul. 13, 2021, 8 pages.
Notice of Allowance mailed on Jun. 15, 2023, issued in connection with U.S. Appl. No. 17/305,920, filed Jul. 16, 2021, 8 pages.
Notice of Allowance mailed on Aug. 16, 2023, issued in connection with U.S. Appl. No. 17/536,572, filed Nov. 29, 2021, 7 pages.
Notice of Allowance mailed on Apr. 17, 2024, issued in connection with U.S. Appl. No. 18/088,976, filed Dec. 27, 2022, 7 pages.
Notice of Allowance mailed on Apr. 17, 2024, issued in connection with U.S. Appl. No. 18/471,693, filed Sep. 21, 2023, 12 pages.
Notice of Allowance mailed on Oct. 2, 2023, issued in connection with U.S. Appl. No. 17/810,533, filed Jul. 1, 2022, 8 pages.
Notice of Allowance mailed on Aug. 21, 2023, issued in connection with U.S. Appl. No. 17/548,921, filed Dec. 13, 2021, 10 pages.
Notice of Allowance mailed on Jul. 21, 2023, issued in connection with U.S. Appl. No. 17/986,241, filed Nov. 14, 2022, 12 pages.
Notice of Allowance mailed on May 24, 2024, issued in connection with U.S. Appl. No. 18/154,228, filed Jan. 13, 2023, 8 pages.
Notice of Allowance mailed on Nov. 24, 2023, issued in connection with U.S. Appl. No. 18/070,024, filed Nov. 28, 2022, 7 pages.
Notice of Allowance mailed on Mar. 27, 2024, issued in connection with U.S. Appl. No. 18/061,570, filed Dec. 5, 2022, 8 pages.
Notice of Allowance mailed on Sep. 27, 2023, issued in connection with U.S. Appl. No. 17/656,794, filed Mar. 28, 2022, 11 pages.
Notice of Allowance mailed on Sep. 27, 2023, issued in connection with U.S. Appl. No. 18/048,945, filed Oct. 24, 2022, 9 pages.
Notice of Allowance mailed on Sep. 27, 2023, issued in connection with U.S. Appl. No. 18/061,243, filed Dec. 2, 2022, 8 pages.
Notice of Allowance mailed on Feb. 28, 2024, issued in connection with U.S. Appl. No. 16/989,350, filed Aug. 10, 2020, 9 pages.
Notice of Allowance mailed on Mar. 28, 2024, issued in connection with U.S. Appl. No. 18/316,400, filed May 12, 2023, 8 pages.
Notice of Allowance mailed on Sep. 29, 2023, issued in connection with U.S. Appl. No. 16/168,389, filed Oct. 23, 2018, 11 pages.
Notice of Allowance mailed on May 3, 2024, issued in connection with U.S. Appl. No. 18/331,580, filed Jun. 8, 2023, 7 pages.
Notice of Allowance mailed on Jun. 30, 2023, issued in connection with U.S. Appl. No. 17/303,001, filed May 18, 2021, 8 pages.
Notice of Allowance mailed on Aug. 31, 2023, issued in connection with U.S. Appl. No. 18/145,520, filed Dec. 22, 2022, 2 pages.
Notice of Allowance mailed on Aug. 4, 2023, issued in connection with U.S. Appl. No. 18/145,520, filed Dec. 22, 2022, 10 pages.
Notice of Allowance mailed on Mar. 8, 2024, issued in connection with U.S. Appl. No. 17/135,173, filed Dec. 28, 2020, 9 pages.

Notice of Allowance mailed on Nov. 8, 2023, issued in connection with U.S. Appl. No. 18/066,093, filed Dec. 14, 2022, 11 pages.
Advisory Action mailed on Nov. 7, 2022, issued in connection with U.S. Appl. No. 16/168,389, filed Oct. 23, 2018, 4 pages.
Advisory Action mailed on Dec. 13, 2023, issued in connection with U.S. Appl. No. 18/048,034, filed Oct. 20, 2022, 4 pages.
Advisory Action mailed on Feb. 26, 2024, issued in connection with U.S. Appl. No. 17/532,744, filed Nov. 22, 2021, 4 pages.
Advisory Action mailed on Sep. 8, 2021, issued in connection with U.S. Appl. No. 16/168,389, filed Oct. 23, 2018, 4 pages.
Australian Patent Office, Australian Examination Report Action mailed on Jul. 11, 2023, issued in connection with Australian Application No. 2022246446, 2 pages.
Australian Patent Office, Australian Examination Report Action mailed on Jun. 14, 2023, issued in connection with Australian Application No. 2019299865, 2 pages.
Australian Patent Office, Australian Examination Report Action mailed on Sep. 25, 2023, issued in connection with Australian Application No. 2018338812, 3 pages.
Australian Patent Office, Australian Examination Report Action mailed on Oct. 31, 2023, issued in connection with Australian Application No. 2023203687, 2 pages.
Canadian Patent Office, Canadian Examination Report mailed on Oct. 12, 2023, issued in connection with Canadian Application No. 3084279, 4 pages.
Canadian Patent Office, Canadian Examination Report mailed on Dec. 19, 2023, issued in connection with Canadian Application No. 3067776, 3 pages.
Canadian Patent Office, Canadian Examination Report mailed on Apr. 29, 2024, issued in connection with Canadian Application No. 3164558, 4 pages.
Canadian Patent Office, Canadian Examination Report mailed on Jan. 3, 2024, issued in connection with Canadian Application No. 3123601, 3 pages.
Canadian Patent Office, Canadian Examination Report mailed on May 8, 2024, issued in connection with Canadian Application No. 3146914, 5 pages.
Chinese Patent Office, First Office Action and Translation mailed on Apr. 23, 2024, issued in connection with Chinese Application No. 202110542908.5, 10 pages.
Chinese Patent Office, First Office Action and Translation mailed on Sep. 6, 2023, issued in connection with Chinese Application No. 202010179593.8, 14 pages.
Chinese Patent Office, Second Office Action mailed on May 30, 2023, issued in connection with Chinese Application No. 201980070006.7, 9 pages.
European Patent Office, European EPC Article 94.3 mailed on Jun. 5, 2023, issued in connection with European Application No. 20710649.3, 8 pages.
European Patent Office, European EPC Article 94.3 mailed on Jan. 10, 2024, issued in connection with European Application No. 20757152.2, 6 pages.
European Patent Office, European EPC Article 94.3 mailed on Oct. 12, 2023, issued in connection with European Application No. 20736489.4, 8 pages.
European Patent Office, European EPC Article 94.3 mailed on Dec. 18, 2023, issued in connection with European Application No. 21703134.3, 7 pages.
European Patent Office, European EPC Article 94.3 mailed on Jan. 24, 2024, issued in connection with European Application No. 21180778.9, 8 pages.
European Patent Office, European EPC Article 94.3 mailed on Jun. 27, 2023, issued in connection with European Application No. 21195031.6, 4 pages.
European Patent Office, European EPC Article 94.3 mailed on Nov. 27, 2023, issued in connection with European Application No. 19780508.8, 7 pages.
European Patent Office, European EPC Article 94.3 mailed on Feb. 28, 2024, issued in connection with European Application No. 18306501, 7 pages.
European Patent Office, European EPC Article 94.3 mailed on Nov. 28, 2023, issued in connection with European Application No. 19731415.6, 9 pages.

(56)                    References Cited

OTHER PUBLICATIONS

European Patent Office, European EPC Article 94.3 mailed on Apr. 29, 2024, issued in connection with European Application No. 21195031.6, 4 pages.
European Patent Office, European EPC Article 94.3 mailed on Mar. 29, 2023, issued in connection with European Application No. 22182193.7, 4 pages.
European Patent Office, European EPC Article 94.3 mailed on Aug. 31, 2023, issued in connection with European Application No. 19773326.4, 5 pages.
European Patent Office, European EPC Article 94.3 mailed on Jul. 31, 2023, issued in connection with European Application No. 21164130.3, 5 pages.
European Patent Office, European EPC Article 94.3 mailed on Apr. 6, 2023, issued in connection with European Application No. 21193616.6, 7 pages.
European Patent Office, European EPC Article 94.3 mailed on Sep. 6, 2023, issued in connection with European Application No. 19197116.7, 4 pages.
European Patent Office, European EPC Article 94.3 mailed on Sep. 7, 2023, issued in connection with European Application No. 20185599.6, 6 pages.
European Patent Office, European Extended Search Report mailed on Jan. 2, 2024, issued in connection with European Application No. 23188226.7, 10 pages.
European Patent Office, European Search Report mailed on Feb. 2, 2024, issued in connection with European Application No. 23200723.7, 5 pages.
European Patent Office, European Search Report mailed on Sep. 21, 2023, issued in connection with European Application No. 23172783.5, 8 pages.
Final Office Action mailed on May 17, 2023, issued in connection with U.S. Appl. No. 16/168,389, filed Oct. 23, 2018, 44 pages.
Final Office Action mailed on Aug. 22, 2022, issued in connection with U.S. Appl. No. 16/168,389, filed Oct. 23, 2018, 37 pages.
Final Office Action mailed on Aug. 22, 2023, issued in connection with U.S. Appl. No. 18/061,570, filed Dec. 5, 2022, 12 pages.
Final Office Action mailed on Aug. 25, 2023, issued in connection with U.S. Appl. No. 16/989,350, filed Aug. 10, 2020, 21 pages.
Final Office Action mailed on Feb. 27, 2024, issued in connection with U.S. Appl. No. 17/340,590, filed Jun. 7, 2021, 28 pages.
Final Office Action mailed on Sep. 27, 2023, issued in connection with U.S. Appl. No. 18/048,034, filed Oct. 20, 2022, 9 pages.
Final Office Action mailed on Jun. 4, 2021, issued in connection with U.S. Appl. No. 16/168,389, filed Oct. 23, 2018, 38 pages.
Final Office Action mailed on Oct. 6, 2023, issued in connection with U.S. Appl. No. 17/532,744, filed Nov. 22, 2021, 21 pages.
Final Office Action mailed on Aug. 9, 2023, issued in connection with U.S. Appl. No. 17/493,430, filed Oct. 4, 2021, 19 pages.
*Google LLC* v. *Sonos, Inc.*, International Trade Commission Case No. 337-TA-1330, Order No. 25: Regarding Respondent Sonos, Inc.'s Omnibus Motion for Summary Determination; dated May 16, 2023, 7 pages.
*Google LLC* v. *Sonos, Inc.*, International Trade Commission Case No. 337-TA-1330, Order No. 28: Regarding Respondent Sonos, Inc.'s Omnibus Motion for Summary Determination; dated May 22, 2023, 3 pages.
*Google LLC* v. *Sonos, Inc.*, International Trade Commission Case No. 337-TA-1330, Order No. 37: Regarding Complainant Google LLC's Motions in Limine; dated Jul. 7, 2023, 10 pages.
*Google LLC* v. *Sonos, Inc.*, International Trade Commission Case No. 337-TA-1330, Respondent Sonos, Inc.'s Motion in Limine No. 4. Motion to Exclude Untimely Validity Arguments Regarding Claim 11 of U.S. Pat. No. 11,024,311; dated Jun. 13, 2023, 34 pages.
*Google LLC* v. *Sonos, Inc.*, International Trade Commission Case No. 337-TA-1330, Respondent Sonos, Inc.'s Response to Google's Motion in Limine No. 3 Preclude Sonos from Presenting Evidence or Argument that Claim 3 of the '748 Patent is Indefinite for Lack of Antecedent Basis; dated Jun. 12, 2023, 26 pages.

Indian Patent Office, Examination Report mailed on Feb. 28, 2024, issued in connection with Indian Patent Application No. 201847035625, 3 pages.
Indian Patent Office, Examination Report mailed on Dec. 5, 2023, issued in connection with Indian Patent Application No. 201847035625, 3 pages.
International Bureau, International Search Report and Written Opinion mailed on Mar. 20, 2023, issued in connection with International Application No. PCT/US2022/045399, filed on Sep. 30, 2022, 25 pages.
International Searching Authority, Invitation to Pay Additional Fees on Jan. 27, 2023, issued in connection with International Application No. PCT/US2022/045399, filed on Sep. 30, 2022, 19 pages.
Japanese Patent Office, Decision of Refusal and Translation mailed on May 23, 2023, issued in connection with Japanese Patent Application No. 2021-163622, 13 pages.
Japanese Patent Office, Notice of Reasons for Refusal and Translation mailed on Aug. 8, 2023, issued in connection with Japanese Patent Application No. 2022-101346, 6 pages.
Korean Patent Office, Korean Examination Report and Translation mailed on Jul. 19, 2023, issued in connection with Korean Application No. 10-2022-7024007, 9 pages.
Korean Patent Office, Korean Preliminary Rejection and Translation mailed on Dec. 26, 2023, issued in connection with Korean Application No. 10-2023-7031855, 4 pages.
Korean Patent Office, Korean Preliminary Rejection and Translation mailed on Dec. 5, 2023, issued in connection with Korean Application No. 10-2023-7032988, 11 pages.
Non-Final Office Action mailed on Feb. 1, 2024, issued in connection with U.S. Appl. No. 18/313,013, filed May 5, 2023, 47 pages.
Non-Final Office Action mailed on May 1, 2024, issued in connection with U.S. Appl. No. 17/650,441, filed Feb. 9, 2022, 12 pages.
Non-Final Office Action mailed on Aug. 10, 2023, issued in connection with U.S. Appl. No. 18/070,024, filed Nov. 28, 2022, 4 pages.
Non-Final Office Action mailed on Dec. 13, 2023, issued in connection with U.S. Appl. No. 18/316,400, filed May 12, 2023, 6 pages.
Non-Final Office Action mailed on Dec. 13, 2023, issued in connection with U.S. Appl. No. 18/316,434, filed May 12, 2023, 29 pages.
Non-Final Office Action mailed on Mar. 13, 2024, issued in connection with U.S. Appl. No. 18/309,939, filed May 1, 2023, 15 pages.
Non-Final Office Action mailed on Sep. 14, 2023, issued in connection with U.S. Appl. No. 17/528,843, filed Nov. 17, 2021, 20 pages.
Non-Final Office Action mailed on Jan. 18, 2024, issued in connection with U.S. Appl. No. 18/048,034, filed Oct. 20, 2022, 10 pages.
Non-Final Office Action mailed on Jul. 18, 2023, issued in connection with U.S. Appl. No. 18/066,093, filed Dec. 14, 2022, 12 pages.
Non-Final Office Action mailed on Mar. 18, 2024, issued in connection with U.S. Appl. No. 17/532,744, filed Nov. 22, 2021, 20 pages.
Non-Final Office Action mailed on Jan. 19, 2024, issued in connection with U.S. Appl. No. 18/331,580, filed Jun. 8, 2023, 11 pages.
Non-Final Office Action mailed on May 20, 2024, issued in connection with U.S. Appl. No. 18/600,044, filed Mar. 8, 2024, 24 pages.
Non-Final Office Action mailed on Nov. 21, 2023, issued in connection with U.S. Appl. No. 18/088,976, filed Dec. 27, 2022, 9 pages.
Non-Final Office Action mailed on Dec. 22, 2022, issued in connection with U.S. Appl. No. 16/168,389, filed Oct. 23, 2018, 39 pages.
Non-Final Office Action mailed on Jun. 23, 2023, issued in connection with U.S. Appl. No. 18/048,945, filed Oct. 24, 2022, 10 pages.
Non-Final Office Action mailed on Oct. 23, 2023, issued in connection with U.S. Appl. No. 17/932,715, filed Sep. 16, 2022, 14 pages.

(56) References Cited

OTHER PUBLICATIONS

Non-Final Office Action mailed on Apr. 24, 2024, issued in connection with U.S. Appl. No. 18/461,430, filed Sep. 5, 2023, 22 pages.

Non-Final Office Action mailed on May 25, 2023, issued in connection with U.S. Appl. No. 18/157,937, filed Jan. 23, 2023, 9 pages.

Non-Final Office Action mailed on Apr. 26, 2024, issued in connection with U.S. Appl. No. 18/310,025, filed May 1, 2023, 9 pages.

Non-Final Office Action mailed on Jan. 26, 2024, issued in connection with U.S. Appl. No. 17/450,925, filed Oct. 14, 2021, 9 pages.

Non-Final Office Action mailed on Aug. 28, 2023, issued in connection with U.S. Appl. No. 17/722,661, filed Apr. 18, 2022, 16 pages.

Non-Final Office Action mailed on Mar. 28, 2024, issued in connection with U.S. Appl. No. 18/192,452, filed Mar. 29, 2023, 7 pages.

Non-Final Office Action mailed on Feb. 29, 2024, issued in connection with U.S. Appl. No. 18/449,244, filed Aug. 14, 2023, 15 pages.

Non-Final Office Action mailed on Jul. 3, 2023, issued in connection with U.S. Appl. No. 17/135,173, filed Dec. 28, 2020, 22 pages.

Non-Final Office Action mailed on May 30, 2024, issued in connection with U.S. Appl. No. 18/503,971, filed Nov. 7, 2023, 8 pages.

Non-Final Office Action mailed on Jul. 5, 2023, issued in connection with U.S. Appl. No. 18/061,579, filed Dec. 5, 2022, 11 pages.

Non-Final Office Action mailed on Oct. 6, 2023, issued in connection with U.S. Appl. No. 17/222,950, filed Apr. 5, 2021, 9 pages.

Non-Final Office Action mailed on Dec. 7, 2021, issued in connection with U.S. Appl. No. 16/168,389, filed Oct. 23, 2018, 36 pages.

Non-Final Office Action mailed on Jun. 7, 2023, issued in connection with U.S. Appl. No. 16/179,779, filed Nov. 2, 2018, 29 pages.

Non-Final Office Action mailed on Sep. 7, 2023, issued in connection with U.S. Appl. No. 17/340,590, filed Jun. 7, 2021, 18 pages.

Non-Final Office Action mailed on Jun. 8, 2023, issued in connection with U.S. Appl. No. 18/048,034, filed Oct. 20, 2022, 8 pages.

Non-Final Office Action mailed on Jun. 8, 2023, issued in connection with U.S. Appl. No. 18/061,243, filed Dec. 2, 2022, 10 pages.

Non-Final Office Action mailed on Sep. 9, 2020, issued in connection with U.S. Appl. No. 16/168,389, filed Oct. 23, 2018, 29 pages.

Notice of Allowance mailed on Jun. 9, 2023, issued in connection with U.S. Appl. No. 17/532,674, filed Nov. 22, 2021, 13 pages.

Notice of Allowance mailed on Jul. 10, 2023, issued in connection with U.S. Appl. No. 17/315,599, filed May 10, 2021, 2 pages.

Notice of Allowance mailed on Aug. 11, 2023, issued in connection with U.S. Appl. No. 17/878,649, filed Aug. 1, 2022, 7 pages.

Notice of Allowance mailed on May 11, 2023, issued in connection with U.S. Appl. No. 18/061,638, filed Dec. 5, 2022, 15 pages.

Notice of Allowance mailed on Jul. 12, 2023, issued in connection with U.S. Appl. No. 18/151,619, filed Jan. 9, 2023, 13 pages.

Notice of Allowance mailed on Jun. 12, 2023, issued in connection with U.S. Appl. No. 17/453,632, filed Nov. 4, 2021, 9 pages.

Notice of Allowance mailed on Jul. 13, 2023, issued in connection with U.S. Appl. No. 18/145,501, filed Dec. 22, 2022, 9 pages.

Notice of Allowance mailed on Jun. 13, 2023, issued in connection with U.S. Appl. No. 17/249,776, filed Mar. 12, 2021, 10 pages.

* cited by examiner

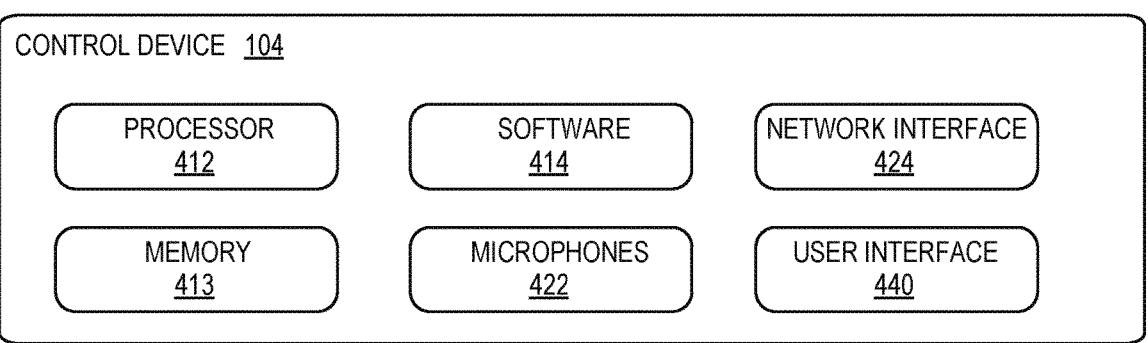

CONTROL DEVICE  104

| PROCESSOR 412 | SOFTWARE 414 | NETWORK INTERFACE 424 |
| MEMORY 413 | MICROPHONES 422 | USER INTERFACE 440 |

NOW PLAYING  (Office)

Track Title
Artist Name     } 444

QUEUE

Track 1
Track 2
Track 3     } 446
Track 4

Music Source 1    First VAS
Music Source 2    Second VAS
Music Source 3     } 448
+ ADD Music source    + ADD VAS source

🔊 ━━━━━⬤━━━━━

🔁
🔀   (◀◀)   (▶)   (▶▶)   [↑↓]     } 442

☆ Sonos    🎵 Browse    🏠 Rooms    🔍 Search music    441

No Music
Balcony    [Group]

Audio Component
*Living Room*
Living Room    [Group]

No Music
Dining Room
+ Kitchen    [Group]

No Music
Office    [Group]

(◀◀)   (▶)   (▶▶)

☆ Sonos    🎵 Browse    🏠 Rooms    🔍 Search music

*Figure 4C*

MULTIPLE STAGE NETWORK MICROPHONE DEVICE WITH REDUCED POWER CONSUMPTION AND PROCESSING LOAD

CROSS REFERENCE TO RELATED APPLICATIONS

This application is a continuation under 35 U.S.C. § 120 of U.S. patent application Ser. No. 16/168,389, filed Oct. 23, 2018. The content of this application is incorporated herein by reference in its entirety. 18-0301

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings where:

FIG. 4A is a functional block diagram of an example controller device in accordance with aspects of the disclosure;

FIGS. 4B and 4C are controller interfaces in accordance with aspects of the disclosure;

Figure 1A:
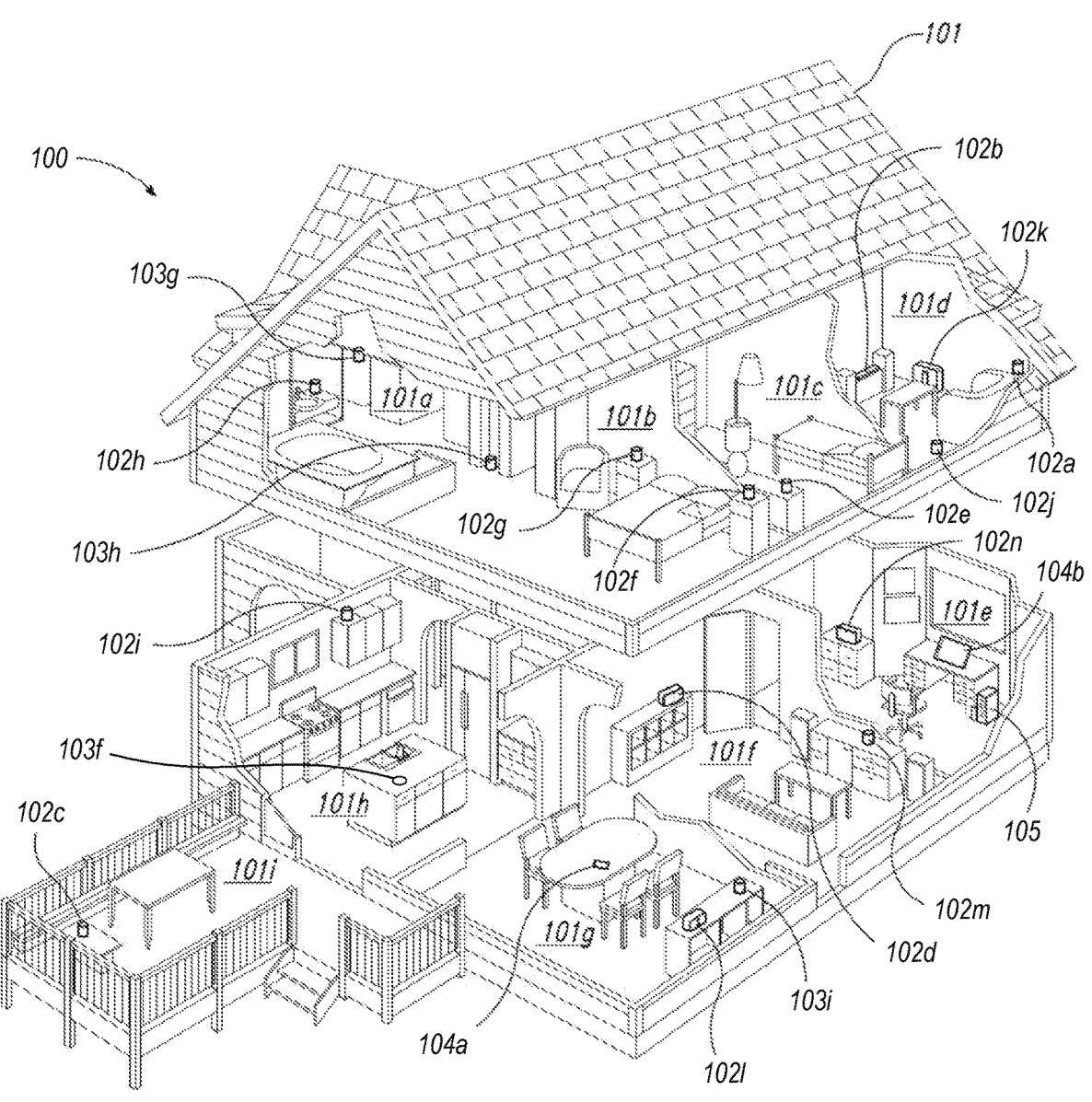
FIG. 1A is a partial cutaway view of an environment having a media playback system configured in accordance with aspects of the disclosed technology.

The drawings are for purposes of illustrating example embodiments, but it should be understood that the inventions are not limited to the arrangements and instrumentality shown in the drawings. In the drawings, identical reference numbers identify at least generally similar elements. To facilitate the discussion of any particular element, the most significant digit or digits of any reference number refers to the Figure in which that element is first introduced. For example, element 103*a* is first introduced and discussed with reference to FIG. 1A.

DETAILED DESCRIPTION

I. Overview

Voice control can be beneficial in a "smart" home that includes smart appliances and devices that are connected to a communication network, such as wireless audio playback devices, illumination devices, and home-automation devices (e.g., thermostats, door locks, etc.). In some implementations, network microphone devices may be used to control smart home devices.

A network microphone device ("NMD") is a networked computing device that typically includes an arrangement of microphones, such as a microphone array, that is configured to detect sounds present in the NMD's environment. The detected sound may include a person's speech mixed with background noise (e.g., music being output by a playback device or other ambient noise). In practice, an NMD typically filters detected sound to remove the background noise from the person's speech to facilitate identifying whether the speech contains a voice input indicative of voice control. If so, the NMD may take action based on such a voice input.

An NMD often employs a wake-word engine, which is typically onboard the NMD, to identify whether sound detected by the NMD contains a voice input that includes a particular wake word. The wake-word engine may be configured to identify (i.e., "spot") a particular wake word using one or more identification algorithms. This wake word identification process is commonly referred to as "keyword spotting." In practice, to help facilitate keyword spotting, the NMD may buffer sound detected by a microphone of the NMD and then use the wake-word engine to process that buffered sound to determine whether a wake word is present.

When a wake-word engine spots a wake word in detected sound, the NMD may determine that a wake-word event (i.e., a "wake-word trigger") has occurred, which indicates that the NMD has detected sound that includes a potential voice input. The occurrence of the wake-word event typi- [5] cally causes the NMD to perform additional processes involving the detected sound. In some implementations, these additional processes may include outputting an alert (e.g., an audible chime and/or a light indicator) indicating that a wake word has been identified and extracting [10] detected-sound data from a buffer, among other possible additional processes. Extracting the detected sound may include reading out and packaging a stream of the detected-sound according to a particular format and transmitting the packaged sound-data to an appropriate VAS for interpreta- [15] tion.

In turn, the VAS corresponding to the wake word that was identified by the wake-word engine receives the transmitted sound data from the NMD over a communication network. A VAS traditionally takes the form of a remote service [20] implemented using one or more cloud servers configured to process voice inputs (e.g., AMAZON's ALEXA, APPLE's SIRI, MICROSOFT's CORTANA, GOOGLE'S ASSISTANT, etc.). In some instances, certain components and functionality of the VAS may be distributed across local and [25] remote devices. Additionally, or alternatively, a VAS may take the form of a local service implemented at an NMD or a media playback system comprising the NMD such that a voice input or certain types of voice input (e.g., rudimentary commands) are processed locally without intervention from [30] a remote VAS.

In any case, when a VAS receives detected-sound data, the VAS will typically process this data, which involves identifying the voice input and determining an intent of words captured in the voice input. The VAS may then provide a [35] response back to the NMD with some instruction according to the determined intent. Based on that instruction, the NMD may cause one or more smart devices to perform an action. For example, in accordance with an instruction from a VAS, an NMD may cause a playback device to play a particular [40] song or an illumination device to turn on/off, among other examples. In some cases, an NMD, or a media system with NMDs (e.g., a media playback system with NMD-equipped playback devices) may be configured to interact with multiple VASes. In practice, the NMD may select one VAS over [45] another based on the particular wake word identified in the sound detected by the NMD.

In some implementations, a playback device that is configured to be part of a networked media playback system may include components and functionality of an NMD (i.e., [50] the playback device is "NMD-equipped"). In this respect, such a playback device may include a microphone that is configured to detect sounds present in the playback device's environment, such as people speaking, audio being output by the playback device itself or another playback device that [55] is nearby, or other ambient noises, and may also include components for buffering detected sound to facilitate wake word identification.

Some NMD-equipped playback devices may include an internal power source (e.g., a rechargeable battery) that [60] allows the playback device to operate without being physically connected to a wall electrical outlet or the like. In this regard, such a playback device may be referred to herein as a "portable playback device." On the other hand, playback devices that are configured to rely on power from a wall [65] electrical outlet or the like may be referred to herein as "stationary playback devices," although such devices may in fact be moved around a home or other environment. In practice, a person might often take a portable playback device to and from a home or other environment in which one or more stationary playback devices remain.

In some cases, multiple voice services are configured for the NMD, or a system of NMDs (e.g., a media playback system of playback devices). One or more services can be configured during a set-up procedure, and additional voice services can be configured for the system later on. As such, the NMD acts as an interface with multiple voice services, perhaps alleviating a need to have an NMD from each of the voice services to interact with the respective voice services. Yet further, the NMD can operate in concert with service-specific NMDs present in a household to process a given voice command.

Where two or more voice services are configured for the NMD, a particular voice service can be invoked by utterance of a wake word corresponding to the particular voice service. For instance, in querying AMAZON, a user might speak the wake word "Alexa" followed by a voice command. Other examples include "Ok, Google" for querying GOOGLE and "Hey, Siri" for querying APPLE.

In some cases, a generic wake word can be used to indicate a voice input to an NMD. In some cases, this is a manufacturer-specific wake word rather than a wake word tied to any particular voice service (e.g., "Hey, Sonos" where the NMD is a SONOS playback device). Given such a wake word, the NMD can identify a particular voice service to process the request. For instance, if the voice input following the wake word is related to a particular type of command (e.g., music playback), then the voice input is sent to a particular voice service associated with that type of command (e.g. a streaming music service having voice command capabilities).

Keyword spotting can be computationally demanding and power intensive, as it involves continuously processing sound data to detect whether the sound data includes one or more keywords. Further, in the case of portable playback devices (e.g., battery-powered playback devices), keyword spotting can draw additional power from its battery, which reduces the amount of time that the portable device can operate before re-charging.

Additionally, keyword spotting algorithms may consume significant memory on a playback device, leading to larger memory requirements and slower over-the-air software updates of keyword spotting algorithms. One way to address these issues is to employ keyword spotting algorithms that are designed to be computationally efficient and/or to require less memory. For instance, certain keyword spotting algorithms may be inherently more efficient than others based on the manner in which the algorithms process the captured sound data. Further, a particular keyword spotting algorithm may be made more computationally efficient as well, for instance, by using simpler models to define the keywords or by using simpler filters to process the captured sound data, which results in fewer processing operations when comparing the captured sound data to the keyword models. Other examples of adjusting a keyword spotting algorithm to improve its computational efficiency can be employed in various embodiments. However, keyword spotting algorithms that are less computationally intensive are also typically less accurate at detecting keywords and can result in a higher rate of false positives and/or false negatives.

Disclosed herein are systems and methods to help address these or other issues. In particular, in order to reduce the NMD's computational resource usage, power consumption, and/or memory requirements while still maintaining sufficiently high accuracy at detecting wake words, the NMD performs two or more keyword spotting algorithms of varying computational complexity. For instance, when listening for one or more wake words, the NMD uses a first keyword spotting algorithm that uses a relatively low extent of processing power. In line with the discussion above, the first keyword spotting algorithm may sacrifice accuracy in favor of computational simplicity and/or reduced memory requirements. To account for this, in response to detecting a wake word using the first algorithm, the NMD uses a second keyword spotting algorithm that uses a higher extent of processing power and/or greater memory and is more accurate than the first algorithm in order to verify or debunk the presence of the wake word detected by the first algorithm. In this manner, instead of continuously performing a computationally demanding and power intensive keyword spotting algorithm, the NMD only uses such an algorithm sparingly based on preliminary wake-word detections using a less demanding algorithm.

Additionally or alternatively, a first algorithm can be used for preliminary detection of a candidate wake word. Based on the identified candidate wake word, one wake-word engine can be selected from among a plurality of possible wake-word engines. These wake-word engines may utilize algorithms that are more computationally intensive and require more power and memory. As a result, it can be beneficial to only select and activate particular wake-word engines once an appropriate candidate wake word has been detected using the first algorithm for preliminary detection. In some embodiments, the first algorithm used for preliminary detection can be more efficient than the wake-word engines, for example less computationally intensive.

Examples of less-demanding wake-word detection algorithms include neural network models that have been compressed to reduce both memory and power requirements. In some embodiments, the neural network model can be a soft-weight-shared neural network model, which can store weights using compressed sparse row (CSR) representation, or other suitable techniques for achieving a compressed neural network model as described in more detail below.

As an example, in some embodiments an NMD captures audio content via one or more microphones of the NMD, and the NMD uses a first algorithm to determine whether the captured audio content includes a particular candidate wake word from among a plurality of wake words, where each of the plurality of wake words corresponds to a respective voice service. Responsive to determining that the captured sound data includes the particular candidate wake word, the NMD selects and activates a first wake-word engine from among a plurality of wake-word engines. The selected wake-word engine can use a second algorithm to confirm or disconfirm the presence of the candidate wake word in the captured sound data. Here, the second algorithm may be more computationally intensive than the first algorithm. In some embodiments, the second algorithm can be selected from among a plurality of possible wake-word detection algorithms, for example with different algorithms being configured to detect wake words associated with different VASes.

In some embodiments, if the second algorithm confirms the presence of the candidate wake word in the captured sound data, then the NMD causes the respective voice service corresponding to the particular wake word to process the captured audio content. If, instead, the second algorithm disconfirms the presence of the candidate wake word in the captured sound data, then the NMD ceases processing the captured sound data to detect the particular wake word.

While some embodiments described herein may refer to functions performed by given actors, such as "users" and/or other entities, it should be understood that this description is for purposes of explanation only. The claims should not be interpreted to require action by any such example actor unless explicitly required by the language of the claims themselves.

II. Example Operating Environment

Figure 1B:
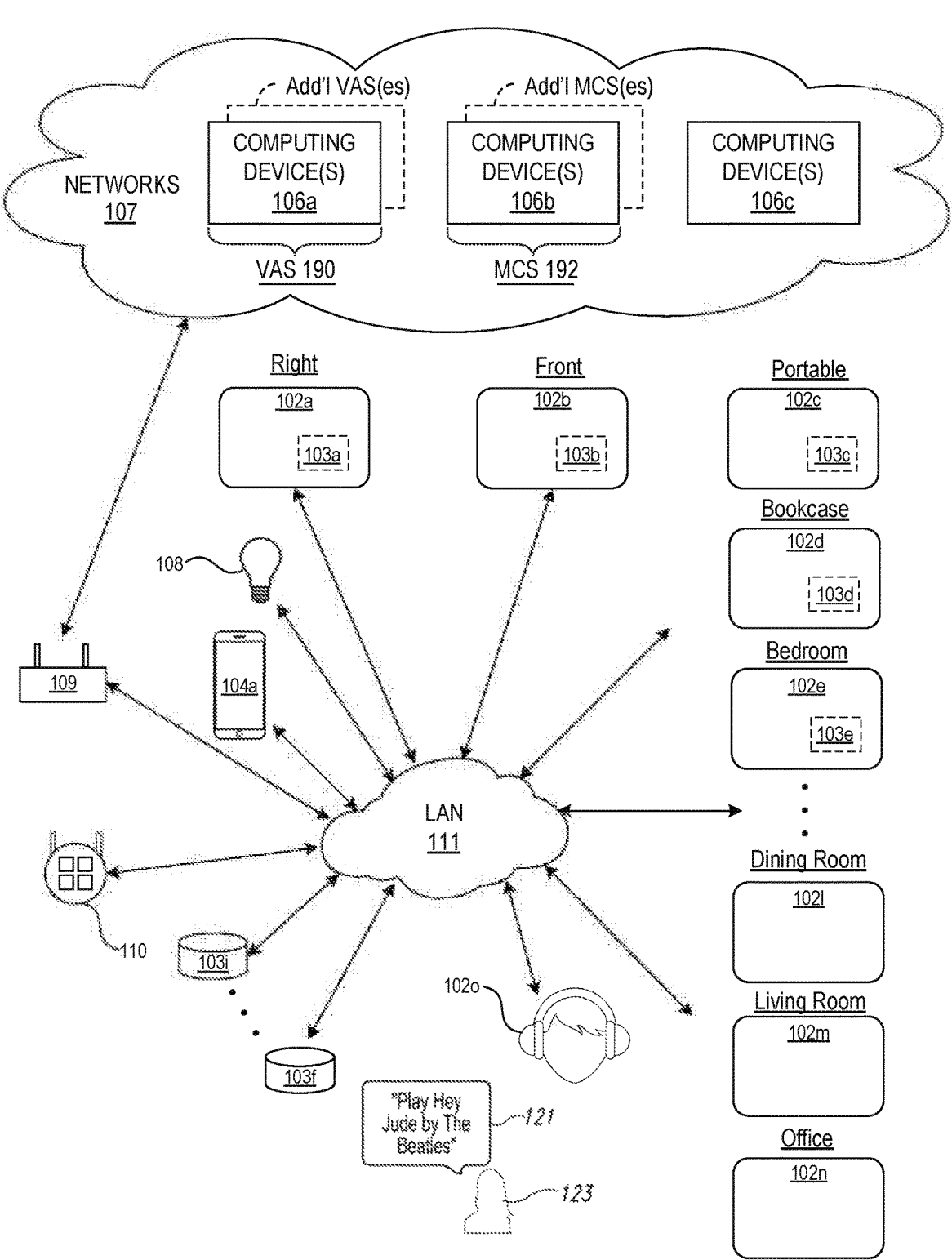
FIG. 1B is a schematic diagram of the media playback system of FIG. 1A and one or more networks.

FIGS. 1A and 1B illustrate an example configuration of a media playback system 100 (or "MPS 100") in which one or more embodiments disclosed herein may be implemented. Referring first to FIG. 1A, the MPS 100 as shown is associated with an example home environment having a plurality of rooms and spaces, which may be collectively referred to as a "home environment," "smart home," or "environment 101." The environment 101 comprises a household having several rooms, spaces, and/or playback zones, including a master bathroom 101*a*, a master bedroom 101*b* (referred to herein as "Nick's Room"), a second bedroom 101*c*, a family room or den 101*d*, an office 101*e*, a living room 101*f*, a dining room 101*g*, a kitchen 101*h*, and an outdoor patio 101*i*. While certain embodiments and examples are described below in the context of a home environment, the technologies described herein may be implemented in other types of environments. In some embodiments, for example, the MPS 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

Within these rooms and spaces, the MPS 100 includes one or more computing devices. Referring to FIGS. 1A and 1B together, such computing devices can include playback devices 102 (identified individually as playback devices 102*a*-1020), network microphone devices 103 (identified individually as "NMDs" 103*a*-102*i*), and controller devices 104*a* and 104*b* (collectively "controller devices 104"). Referring to FIG. 1B, the home environment may include additional and/or other computing devices, including local network devices, such as one or more smart illumination devices 108 (FIG. 1B), a smart thermostat 110, and a local computing device 105 (FIG. 1A). In embodiments described below, one or more of the various playback devices 102 may be configured as portable playback devices, while others may be configured as stationary playback devices. For example, the headphones 102*o* (FIG. 1B) are a portable playback device, while the playback device 102*d* on the bookcase may be a stationary device. As another example, the playback device 102*c* on the Patio may be a battery-powered device, which may allow it to be transported to various areas within the environment 101, and outside of the environment 101, when it is not plugged in to a wall outlet or the like.

With reference still to FIG. 1B, the various playback, network microphone, and controller devices 102-104 and/or other network devices of the MPS 100 may be coupled to one another via point-to-point connections and/or over other connections, which may be wired and/or wireless, via a LAN 111 including a network router 109. For example, the playback device 102*j* in the Den 101*d* (FIG. 1A), which may be designated as the "Left" device, may have a point-to-point connection with the playback device 102*a*, which is also in the Den 101*d* and may be designated as the "Right"

device. In a related embodiment, the Left playback device 102*j* may communicate with other network devices, such as the playback device 102*b*, which may be designated as the "Front" device, via a point-to-point connection and/or other connections via the LAN 111.

As further shown in FIG. 1B, the MPS 100 may be coupled to one or more remote computing devices 106 via a wide area network ("WAN") 107. In some embodiments, each remote computing device 106 may take the form of one or more cloud servers. The remote computing devices 106 may be configured to interact with computing devices in the environment 101 in various ways. For example, the remote computing devices 106 may be configured to facilitate streaming and/or controlling playback of media content, such as audio, in the home environment 101.

In some implementations, the various playback devices, NMDs, and/or controller devices 102-104 may be communicatively coupled to at least one remote computing device associated with a VAS and at least one remote computing device associated with a media content service ("MCS"). For instance, in the illustrated example of FIG. 1B, remote computing devices 106*a* are associated with a VAS 190 and remote computing devices 106*b* are associated with an MCS 192. Although only a single VAS 190 and a single MCS 192 are shown in the example of FIG. 1B for purposes of clarity, the MPS 100 may be coupled to multiple, different VASes and/or MCSes. In some implementations, VASes may be operated by one or more of AMAZON, GOOGLE, APPLE, MICROSOFT, SONOS or other voice assistant providers. In some implementations, MCSes may be operated by one or more of SPOTIFY, PANDORA, AMAZON MUSIC, or other media content services.

As further shown in FIG. 1B, the remote computing devices 106 further include remote computing device 106*c* configured to perform certain operations, such as remotely facilitating media playback functions, managing device and system status information, directing communications between the devices of the MPS 100 and one or multiple VASes and/or MCSes, among other operations. In one example, the remote computing devices 106*c* provide cloud servers for one or more SONOS Wireless HiFi Systems.

In various implementations, one or more of the playback devices 102 may take the form of or include an on-board (e.g., integrated) network microphone device. For example, the playback devices 102*a-e* include or are otherwise equipped with corresponding NMDs 103*a-e*, respectively. A playback device that includes or is equipped with an NMD may be referred to herein interchangeably as a playback device or an NMD unless indicated otherwise in the description. In some cases, one or more of the NMDs 103 may be a stand-alone device. For example, the NMDs 103*f* and 103*g* may be stand-alone devices. A stand-alone NMD may omit components and/or functionality that is typically included in a playback device, such as a speaker or related electronics. For instance, in such cases, a stand-alone NMD may not produce audio output or may produce limited audio output (e.g., relatively low-quality audio output).

The various playback and network microphone devices 102 and 103 of the MPS 100 may each be associated with a unique name, which may be assigned to the respective devices by a user, such as during setup of one or more of these devices. For instance, as shown in the illustrated example of FIG. 1B, a user may assign the name "Bookcase" to playback device 102*d* because it is physically situated on a bookcase. Similarly, the NMD 103*f* may be assigned the named "Island" because it is physically situated on an island countertop in the Kitchen 101*h* (FIG. 1A). Some playback devices may be assigned names according to a zone or room, such as the playback devices 102*e*, 102*l*, 102*m*, and 102*n*, which are named "Bedroom," "Dining Room," "Living Room," and "Office," respectively. Further, certain playback devices may have functionally descriptive names. For example, the playback devices 102*a* and 102*b* are assigned the names "Right" and "Front," respectively, because these two devices are configured to provide specific audio channels during media playback in the zone of the Den 101*d* (FIG. 1A). The playback device 102*c* in the Patio may be named portable because it is battery-powered and/or readily transportable to different areas of the environment 101. Other naming conventions are possible.

As discussed above, an NMD may detect and process sound from its environment, such as sound that includes background noise mixed with speech spoken by a person in the NMD's vicinity. For example, as sounds are detected by the NMD in the environment, the NMD may process the detected sound to determine if the sound includes speech that contains voice input intended for the NMD and ultimately a particular VAS. For example, the NMD may identify whether speech includes a wake word associated with a particular VAS.

In the illustrated example of FIG. 1B, the NMDs 103 are configured to interact with the VAS 190 over a network via the LAN 111 and the router 109. Interactions with the VAS 190 may be initiated, for example, when an NMD identifies in the detected sound a potential wake word. The identification causes a wake-word event, which in turn causes the NMD to begin transmitting detected-sound data to the VAS 190. In some implementations, the various local network devices 102-105 (FIG. 1A) and/or remote computing devices 106*c* of the MPS 100 may exchange various feedback, information, instructions, and/or related data with the remote computing devices associated with the selected VAS. Such exchanges may be related to or independent of transmitted messages containing voice inputs. In some embodiments, the remote computing device(s) and the media playback system 100 may exchange data via communication paths as described herein and/or using a metadata exchange channel as described in U.S. application Ser. No. 15/438,749 filed Feb. 21, 2017, and titled "Voice Control of a Media Playback System," which is herein incorporated by reference in its entirety.

Upon receiving the stream of sound data, the VAS 190 determines if there is voice input in the streamed data from the NMD, and if so the VAS 190 will also determine an underlying intent in the voice input. The VAS 190 may next transmit a response back to the MPS 100, which can include transmitting the response directly to the NMD that caused the wake-word event. The response is typically based on the intent that the VAS 190 determined was present in the voice input. As an example, in response to the VAS 190 receiving a voice input with an utterance to "Play Hey Jude by The Beatles," the VAS 190 may determine that the underlying intent of the voice input is to initiate playback and further determine that intent of the voice input is to play the particular song "Hey Jude." After these determinations, the VAS 190 may transmit a command to a particular MCS 192 to retrieve content (i.e., the song "Hey Jude"), and that MCS 192, in turn, provides (e.g., streams) this content directly to the MPS 100 or indirectly via the VAS 190. In some implementations, the VAS 190 may transmit to the MPS 100 a command that causes the MPS 100 itself to retrieve the content from the MCS 192.

In certain implementations, NMDs may facilitate arbitration amongst one another when voice input is identified in speech detected by two or more NMDs located within proximity of one another. For example, the NMD-equipped playback device 102*d* in the environment 101 (FIG. 1A) is in relatively close proximity to the NMD-equipped Living Room playback device 102*m*, and both devices 102*d* and 102*m* may at least sometimes detect the same sound. In such cases, this may require arbitration as to which device is ultimately responsible for providing detected-sound data to the remote VAS. Examples of arbitrating between NMDs may be found, for example, in previously referenced U.S. application Ser. No. 15/438,749.

In certain implementations, an NMD may be assigned to, or otherwise associated with, a designated or default playback device that may not include an NMD. For example, the Island NMD 103*f* in the Kitchen 101*h* (FIG. 1A) may be assigned to the Dining Room playback device 102*l*, which is in relatively close proximity to the Island NMD 103*f*. In practice, an NMD may direct an assigned playback device to play audio in response to a remote VAS receiving a voice input from the NMD to play the audio, which the NMD might have sent to the VAS in response to a user speaking a command to play a certain song, album, playlist, etc. Additional details regarding assigning NMDs and playback devices as designated or default devices may be found, for example, in previously referenced U.S. patent application Ser. No. 15/438,749.

Further aspects relating to the different components of the example MPS 100 and how the different components may interact to provide a user with a media experience may be found in the following sections. While discussions herein may generally refer to the example MPS 100, technologies described herein are not limited to applications within, among other things, the home environment described above. For instance, the technologies described herein may be useful in other home environment configurations comprising more or fewer of any of the playback, network microphone, and/or controller devices 102-104. For example, the technologies herein may be utilized within an environment having a single playback device 102 and/or a single NMD 103. In some examples of such cases, the LAN 111 (FIG. 1B) may be eliminated and the single playback device 102 and/or the single NMD 103 may communicate directly with the remote computing devices 106*a-d*. In some embodiments, a telecommunication network (e.g., an LTE network, a 5G network, etc.) may communicate with the various playback, network microphone, and/or controller devices 102-104 independent of a LAN.

a. Example Playback & Network Microphone Devices

Figure 2A:
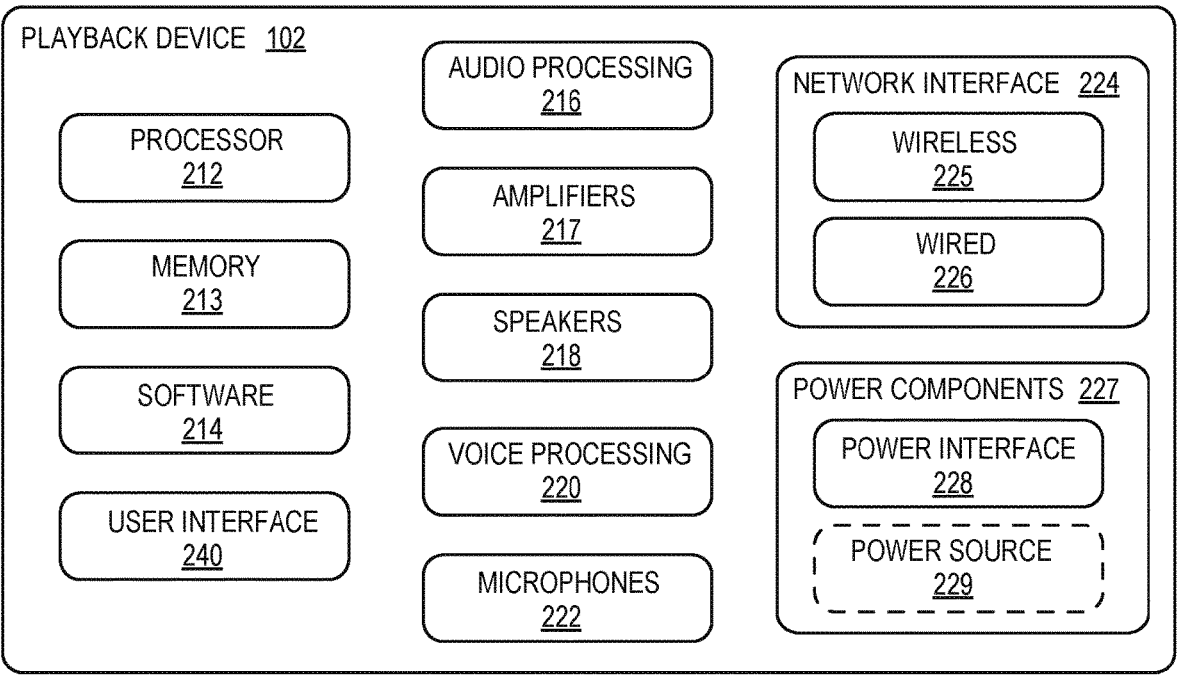
FIG. 2A is a functional block diagram of an example playback device.

FIG. 2A is a functional block diagram illustrating certain aspects of one of the playback devices 102 of the MPS 100 of FIGS. 1A and 1B. As shown, the playback device 102 includes various components, each of which is discussed in further detail below, and the various components of the playback device 102 may be operably coupled to one another via a system bus, communication network, or some other connection mechanism. In the illustrated example of FIG. 2A, the playback device 102 may be referred to as an "NMD-equipped" playback device because it includes components that support the functionality of an NMD, such as one of the NMDs 103 shown in FIG. 1A.

As shown, the playback device 102 includes at least one processor 212, which may be a clock-driven computing component configured to process input data according to instructions stored in memory 213. The memory 213 may be a tangible, non-transitory, computer-readable medium configured to store instructions that are executable by the processor 212. For example, the memory 213 may be data storage that can be loaded with software code 214 that is executable by the processor 212 to achieve certain functions.

In one example, these functions may involve the playback device 102 retrieving audio data from an audio source, which may be another playback device. In another example, the functions may involve the playback device 102 sending audio data, detected-sound data (e.g., corresponding to a voice input), and/or other information to another device on a network via at least one network interface 224. In yet another example, the functions may involve the playback device 102 causing one or more other playback devices to synchronously playback audio with the playback device 102. In yet a further example, the functions may involve the playback device 102 facilitating being paired or otherwise bonded with one or more other playback devices to create a multi-channel audio environment. Numerous other example functions are possible, some of which are discussed below.

As just mentioned, certain functions may involve the playback device 102 synchronizing playback of audio content with one or more other playback devices. During synchronous playback, a listener may not perceive time-delay differences between playback of the audio content by the synchronized playback devices. U.S. Pat. No. 8,234,395 filed on Apr. 4, 2004, and titled "System and method for synchronizing operations among a plurality of independently clocked digital data processing devices," which is hereby incorporated by reference in its entirety, provides in more detail some examples for audio playback synchronization among playback devices.

To facilitate audio playback, the playback device 102 includes audio processing components 216 that are generally configured to process audio prior to the playback device 102 rendering the audio. In this respect, the audio processing components 216 may include one or more digital-to-analog converters ("DAC"), one or more audio preprocessing components, one or more audio enhancement components, one or more digital signal processors ("DSPs"), and so on. In some implementations, one or more of the audio processing components 216 may be a subcomponent of the processor 212. In operation, the audio processing components 216 receive analog and/or digital audio and process and/or otherwise intentionally alter the audio to produce audio signals for playback.

The produced audio signals may then be provided to one or more audio amplifiers 217 for amplification and playback through one or more speakers 218 operably coupled to the amplifiers 217. The audio amplifiers 217 may include components configured to amplify audio signals to a level for driving one or more of the speakers 218.

Each of the speakers 218 may include an individual transducer (e.g., a "driver") or the speakers 218 may include a complete speaker system involving an enclosure with one or more drivers. A particular driver of a speaker 218 may include, for example, a subwoofer (e.g., for low frequencies), a mid-range driver (e.g., for middle frequencies), and/or a tweeter (e.g., for high frequencies). In some cases, a transducer may be driven by an individual corresponding audio amplifier of the audio amplifiers 217. In some implementations, a playback device may not include the speakers 218, but instead may include a speaker interface for connecting the playback device to external speakers. In certain embodiments, a playback device may include neither the speakers 218 nor the audio amplifiers 217, but instead may include an audio interface (not shown) for connecting the playback device to an external audio amplifier or audio-visual receiver.

In addition to producing audio signals for playback by the playback device 102, the audio processing components 216 may be configured to process audio to be sent to one or more other playback devices, via the network interface 224, for playback. In example scenarios, audio content to be processed and/or played back by the playback device 102 may be received from an external source, such as via an audio line-in interface (e.g., an auto-detecting 3.5 mm audio line-in connection) of the playback device 102 (not shown) or via the network interface 224, as described below.

As shown, the at least one network interface 224, may take the form of one or more wireless interfaces 225 and/or one or more wired interfaces 226. A wireless interface may provide network interface functions for the playback device 102 to wirelessly communicate with other devices (e.g., other playback device(s), NMD(s), and/or controller device(s)) in accordance with a communication protocol (e.g., any wireless standard including IEEE 802.11a, 802.11b, 802.11g, 802.11n, 802.11ac, 802.15, 4G mobile communication standard, and so on). A wired interface may provide network interface functions for the playback device 102 to communicate over a wired connection with other devices in accordance with a communication protocol (e.g., IEEE 802.3). While the network interface 224 shown in FIG. 2A include both wired and wireless interfaces, the playback device 102 may in some implementations include only wireless interface(s) or only wired interface(s).

In general, the network interface 224 facilitates data flow between the playback device 102 and one or more other devices on a data network. For instance, the playback device 102 may be configured to receive audio content over the data network from one or more other playback devices, network devices within a LAN, and/or audio content sources over a WAN, such as the Internet. In one example, the audio content and other signals transmitted and received by the playback device 102 may be transmitted in the form of digital packet data comprising an Internet Protocol (IP)-based source address and IP-based destination addresses. In such a case, the network interface 224 may be configured to parse the digital packet data such that the data destined for the playback device 102 is properly received and processed by the playback device 102.

As shown in FIG. 2A, the playback device 102 also includes voice processing components 220 that are operably coupled to one or more microphones 222. The microphones 222 are configured to detect sound (i.e., acoustic waves) in the environment of the playback device 102, which is then provided to the voice processing components 220. More specifically, each microphone 222 is configured to detect sound and convert the sound into a digital or analog signal representative of the detected sound, which can then cause the voice processing component 220 to perform various functions based on the detected sound, as described in greater detail below. In one implementation, the microphones 222 are arranged as an array of microphones (e.g., an array of six microphones). In some implementations, the playback device 102 includes more than six microphones (e.g., eight microphones or twelve microphones) or fewer than six microphones (e.g., four microphones, two microphones, or a single microphones).

In operation, the voice-processing components 220 are generally configured to detect and process sound received via the microphones 222, identify potential voice input in the detected sound, and extract detected-sound data to enable a VAS, such as the VAS 190 (FIG. 1B), to process voice input identified in the detected-sound data. The voice processing components 220 may include one or more analog-to-digital converters, an acoustic echo canceller ("AEC"), a spatial processor (e.g., one or more multi-channel Wiener filters, one or more other filters, and/or one or more beam former components), one or more buffers (e.g., one or more circular buffers), one or more wake-word engines, one or more voice extractors, and/or one or more speech processing components (e.g., components configured to recognize a voice of a particular user or a particular set of users associated with a household), among other example voice processing components. In example implementations, the voice processing components 220 may include or otherwise take the form of one or more DSPs or one or more components of a DSP. In this respect, certain voice processing components 220 may be configured with particular parameters (e.g., gain and/or spectral parameters) that may be modified or otherwise tuned to achieve particular functions. In some implementations, one or more of the voice processing components 220 may be a subcomponent of the processor 212.

In some implementations, the voice-processing components 220 may detect and store a user's voice profile, which may be associated with a user account of the MPS 100. For example, voice profiles may be stored as and/or compared to variables stored in a set of command information or data table. The voice profile may include aspects of the tone or frequency of a user's voice and/or other unique aspects of the user's voice, such as those described in previously-referenced U.S. patent application Ser. No. 15/438,749.

As further shown in FIG. 2A, the playback device 102 also includes power components 227. The power components 227 include at least an external power source interface 228, which may be coupled to a power source (not shown) via a power cable or the like that physically connects the playback device 102 to an electrical outlet or some other external power source. Other power components may include, for example, transformers, converters, and like components configured to format electrical power.

In some implementations, the power components 227 of the playback device 102 may additionally include an internal power source 229 (e.g., one or more batteries) configured to power the playback device 102 without a physical connection to an external power source. When equipped with the internal power source 229, the playback device 102 may operate independent of an external power source. In some such implementations, the external power source interface 228 may be configured to facilitate charging the internal power source 229. As discussed before, a playback device comprising an internal power source may be referred to herein as a "portable playback device." On the other hand, a playback device that operates using an external power source may be referred to herein as a "stationary playback device," although such a device may in fact be moved around a home or other environment.

The playback device 102 further includes a user interface 240 that may facilitate user interactions independent of or in conjunction with user interactions facilitated by one or more of the controller devices 104. In various embodiments, the user interface 240 includes one or more physical buttons and/or supports graphical interfaces provided on touch sensitive screen(s) and/or surface(s), among other possibilities, for a user to directly provide input. The user interface 240 may further include one or more of lights (e.g., LEDs) and the speakers to provide visual and/or audio feedback to a user.

Figure 2B:
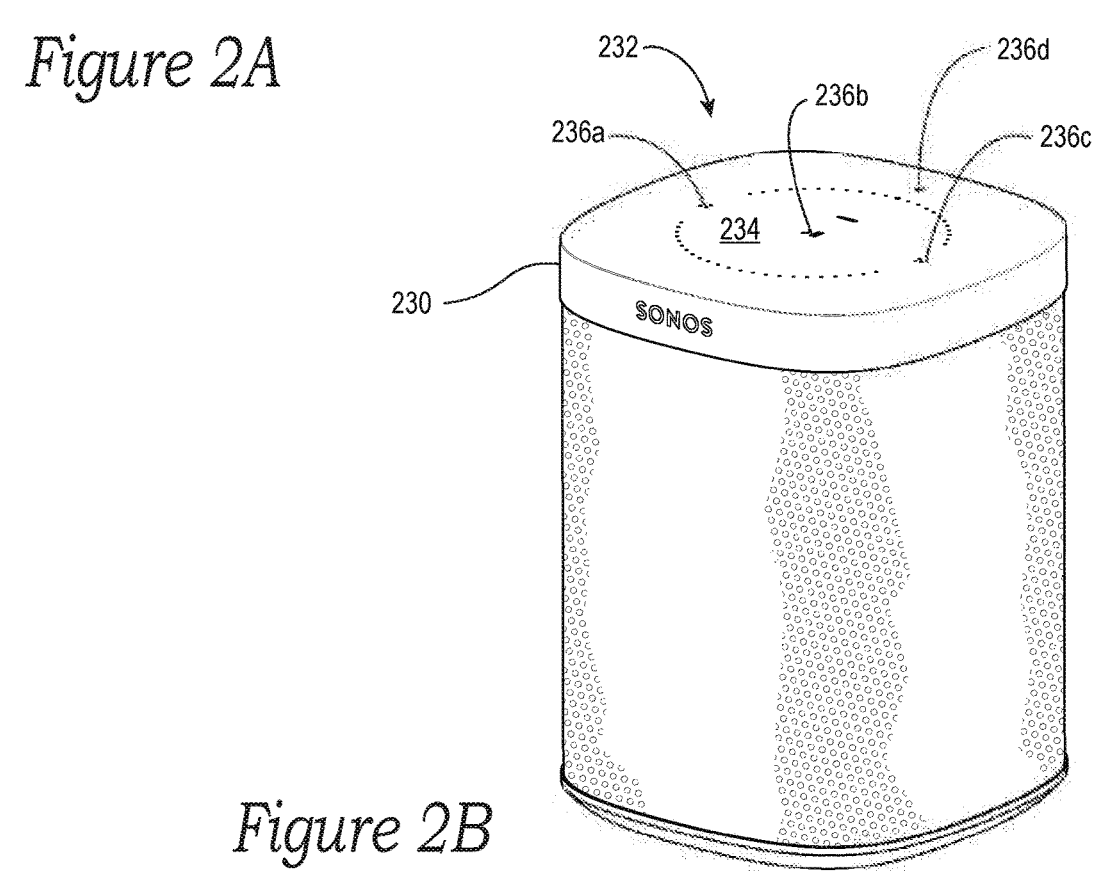
FIG. 2B is an isometric diagram of an example housing of the playback device of FIG. 2A.

As an illustrative example, FIG. 2B shows an example housing 230 of the playback device 102 that includes a user interface in the form of a control area 232 at a top portion 234 of the housing 230. The control area 232 includes buttons 236a-c for controlling audio playback, volume level, and other functions. The control area 232 also includes a button 236d for toggling the microphones 222 to either an on state or an off state.

As further shown in FIG. 2B, the control area 232 is at least partially surrounded by apertures formed in the top portion 234 of the housing 230 through which the microphones 222 (not visible in FIG. 2B) receive the sound in the environment of the playback device 102. The microphones 222 may be arranged in various positions along and/or within the top portion 234 or other areas of the housing 230 so as to detect sound from one or more directions relative to the playback device 102.

By way of illustration, SONOS, Inc. presently offers (or has offered) for sale certain playback devices that may implement certain of the embodiments disclosed herein, including a "PLAY:1," "PLAY:3," "PLAY:5," "PLAYBAR," "CONNECT:AMP," "PLAYBASE," "BEAM," "CONNECT," and "SUB." Any other past, present, and/or future playback devices may additionally or alternatively be used to implement the playback devices of example embodiments disclosed herein. Additionally, it should be understood that a playback device is not limited to the examples illustrated in FIG. 2A or 2B or to the SONOS product offerings. For example, a playback device may include, or otherwise take the form of, a wired or wireless headphone set, which may operate as a part of the media playback system 100 via a network interface or the like. In another example, a playback device may include or interact with a docking station for personal mobile media playback devices. In yet another example, a playback device may be integral to another device or component such as a television, a lighting fixture, or some other device for indoor or outdoor use.

b. Example Playback Device Configurations

Figures 3A, 3B, 3C, 3D, 3E:
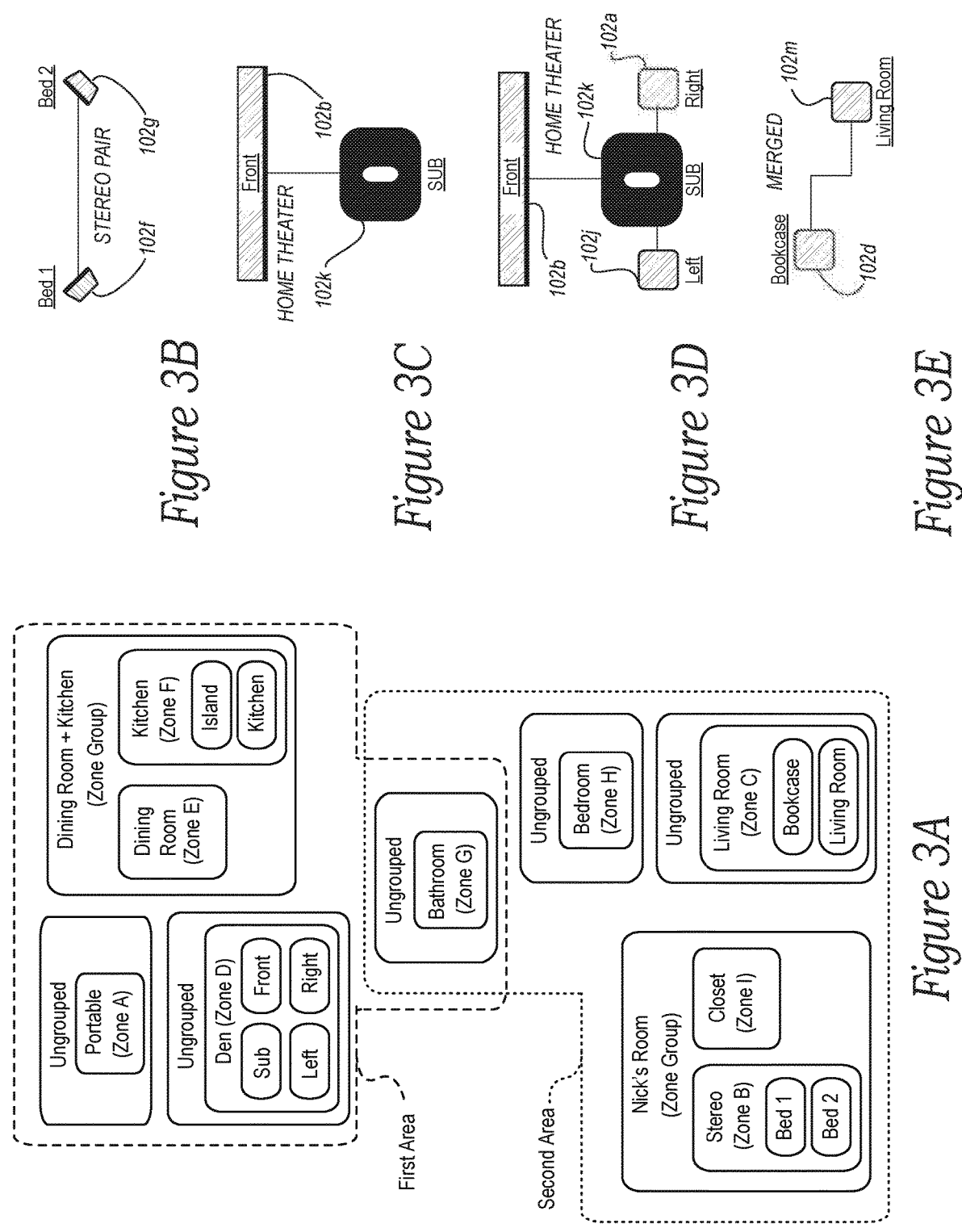
FIGS. 3A-3E are diagrams showing example playback device configurations in accordance with aspects of the disclosure.

FIGS. 3A-3E show example configurations of playback devices. Referring first to FIG. 3A, in some example instances, a single playback device may belong to a zone. For example, the playback device 102c (FIG. 1A) on the Patio may belong to Zone A. In some implementations described below, multiple playback devices may be "bonded" to form a "bonded pair," which together form a single zone. For example, the playback device 102f (FIG. 1A) named "Bed 1" in FIG. 3A may be bonded to the playback device 102g (FIG. 1A) named "Bed 2" in FIG. 3A to form Zone B. Bonded playback devices may have different playback responsibilities (e.g., channel responsibilities). In another implementation described below, multiple playback devices may be merged to form a single zone. For example, the playback device 102d named "Bookcase" may be merged with the playback device 102m named "Living Room" to form a single Zone C. The merged playback devices 102d and 102m may not be specifically assigned different playback responsibilities. That is, the merged playback devices 102d and 102m may, aside from playing audio content in synchrony, each play audio content as they would if they were not merged.

For purposes of control, each zone in the MPS 100 may be represented as a single user interface ("UI") entity. For example, as displayed by the controller devices 104, Zone A may be provided as a single entity named "Portable," Zone B may be provided as a single entity named "Stereo," and Zone C may be provided as a single entity named "Living Room."

In various embodiments, a zone may take on the name of one of the playback devices belonging to the zone. For example, Zone C may take on the name of the Living Room device 102m (as shown). In another example, Zone C may instead take on the name of the Bookcase device 102d. In a further example, Zone C may take on a name that is some combination of the Bookcase device 102d and Living Room device 102m. The name that is chosen may be selected by a user via inputs at a controller device 104. In some embodiments, a zone may be given a name that is different than the device(s) belonging to the zone. For example, Zone B in FIG. 3A is named "Stereo" but none of the devices in Zone B have this name. In one aspect, Zone B is a single UI entity representing a single device named "Stereo," composed of constituent devices "Bed 1" and "Bed 2." In one implementation, the Bed 1 device may be playback device 102f in the master bedroom 101b (FIG. 1A) and the Bed 2 device may be the playback device 102g also in the master bedroom 101b (FIG. 1A).

As noted above, playback devices that are bonded may have different playback responsibilities, such as playback responsibilities for certain audio channels. For example, as shown in FIG. 3B, the Bed 1 and Bed 2 devices 102f and 102g may be bonded so as to produce or enhance a stereo effect of audio content. In this example, the Bed 1 playback device 102f may be configured to play a left channel audio component, while the Bed 2 playback device 102g may be configured to play a right channel audio component. In some implementations, such stereo bonding may be referred to as "pairing."

Additionally, playback devices that are configured to be bonded may have additional and/or different respective speaker drivers. As shown in FIG. 3C, the playback device 102b named "Front" may be bonded with the playback device 102k named "SUB." The Front device 102b may render a range of mid to high frequencies, and the SUB device 102k may render low frequencies as, for example, a subwoofer. When unbonded, the Front device 102b may be configured to render a full range of frequencies. As another example, FIG. 3D shows the Front and SUB devices 102b and 102k further bonded with Right and Left playback devices 102a and 102j, respectively. In some implementations, the Right and Left devices 102a and 102j may form surround or "satellite" channels of a home theater system. The bonded playback devices 102a, 102b, 102j, and 102k may form a single Zone D (FIG. 3A).

In some implementations, playback devices may also be "merged." In contrast to certain bonded playback devices, playback devices that are merged may not have assigned playback responsibilities but may each render the full range of audio content that each respective playback device is capable of. Nevertheless, merged devices may be represented as a single UI entity (i.e., a zone, as discussed above). For instance, FIG. 3E shows the playback devices 102d and 102m in the Living Room merged, which would result in these devices being represented by the single UI entity of Zone C. In one embodiment, the playback devices 102d and 102m may playback audio in synchrony, during which each outputs the full range of audio content that each respective playback device 102d and 102m is capable of rendering.

In some embodiments, a stand-alone NMD may be in a zone by itself. For example, the NMD 103h from FIG. 1A is named "Closet" and forms Zone I in FIG. 3A. An NMD may also be bonded or merged with another device so as to form a zone. For example, the NMD device 103f named "Island" may be bonded with the playback device 102i Kitchen, which together form Zone F, which is also named "Kitchen." Additional details regarding assigning NMDs and playback devices as designated or default devices may be found, for example, in previously referenced U.S. patent application Ser. No. 15/438,749. In some embodiments, a stand-alone NMD may not be assigned to a zone.

Zones of individual, bonded, and/or merged devices may be arranged to form a set of playback devices that playback audio in synchrony. Such a set of playback devices may be referred to as a "group," "zone group," "synchrony group," or "playback group." In response to inputs provided via a controller device 104, playback devices may be dynamically grouped and ungrouped to form new or different groups that synchronously play back audio content. For example, referring to FIG. 3A, Zone A may be grouped with Zone B to form a zone group that includes the playback devices of the two zones. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395.

In various implementations, the zones in an environment may be assigned a particular name, which may be the default name of a zone within a zone group or a combination of the names of the zones within a zone group, such as "Dining Room+Kitchen," as shown in FIG. 3A. In some embodiments, a zone group may be given a unique name selected by a user, such as "Nick's Room," as also shown in FIG. 3A. The name "Nick's Room" may be a name chosen by a user over a prior name for the zone group, such as the room name "Master Bedroom."

Referring back to FIG. 2A, certain data may be stored in the memory 213 as one or more state variables that are periodically updated and used to describe the state of a playback zone, the playback device(s), and/or a zone group associated therewith. The memory 213 may also include the data associated with the state of the other devices of the media playback system 100, which may be shared from time to time among the devices so that one or more of the devices have the most recent data associated with the system.

In some embodiments, the memory 213 of the playback device 102 may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, in FIG. 1A, identifiers associated with the Patio may indicate that the Patio is the only playback device of a particular zone and not in a zone group. Identifiers associated with the Living Room may indicate that the Living Room is not grouped with other zones but includes bonded playback devices 102a, 102b, 102j, and 102k. Identifiers associated with the Dining Room may indicate that the Dining Room is part of Dining Room+Kitchen group and that devices 103f and 102i are bonded. Identifiers associated with the Kitchen may indicate the same or similar information by virtue of the Kitchen being part of the Dining Room+Kitchen zone group. Other example zone variables and identifiers are described below.

In yet another example, the MPS 100 may include variables or identifiers representing other associations of zones and zone groups, such as identifiers associated with Areas, as shown in FIG. 3A. An Area may involve a cluster of zone groups and/or zones not within a zone group. For instance, FIG. 3A shows a first area named "First Area" and a second area named "Second Area." The First Area includes zones and zone groups of the Patio, Den, Dining Room, Kitchen, and Bathroom. The Second Area includes zones and zone groups of the Bathroom, Nick's Room, Bedroom, and Living Room. In one aspect, an Area may be used to invoke a cluster of zone groups and/or zones that share one or more zones and/or zone groups of another cluster. In this respect, such an Area differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the MPS 100 may not implement Areas, in which case the system may not store variables associated with Areas.

The memory 213 may be further configured to store other data. Such data may pertain to audio sources accessible by the playback device 102 or a playback queue that the playback device (or some other playback device(s)) may be associated with. In embodiments described below, the memory 213 is configured to store a set of command data for selecting a particular VAS when processing voice inputs.

During operation, one or more playback zones in the environment of FIG. 1A may each be playing different audio content. For instance, the user may be grilling in the Patio zone and listening to hip hop music being played by the playback device 102c, while another user may be preparing food in the Kitchen zone and listening to classical music being played by the playback device 102i. In another example, a playback zone may play the same audio content in synchrony with another playback zone. For instance, the user may be in the Office zone where the playback device 102n is playing the same hip-hop music that is being playing by playback device 102c in the Patio zone. In such a case, playback devices 102c and 102n may be playing the hip-hop in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the MPS 100 may be dynamically modified. As such, the MPS 100 may support numerous configurations. For example, if a user physically moves one or more playback devices to or from a zone, the MPS 100 may be reconfigured to accommodate the change(s). For instance, if the user physically moves the playback device 102c from the Patio zone to the Office zone, the Office zone may now include both the playback devices 102c and 102n. In some cases, the user may pair or group the moved playback device 102c with the Office zone and/or rename the players in the Office zone using, for example, one of the controller devices 104 and/or voice input. As another example, if one or more playback devices 102 are moved to a particular space in the home environment that is not already a playback zone, the moved playback device(s) may be renamed or associated with a playback zone for the particular space.

Further, different playback zones of the MPS 100 may be dynamically combined into zone groups or split up into individual playback zones. For example, the Dining Room zone and the Kitchen zone may be combined into a zone group for a dinner party such that playback devices 102i and 102l may render audio content in synchrony. As another example, bonded playback devices in the Den zone may be split into (i) a television zone and (ii) a separate listening zone. The television zone may include the Front playback device 102b. The listening zone may include the Right, Left, and SUB playback devices 102a, 102j, and 102k, which may be grouped, paired, or merged, as described above. Splitting the Den zone in such a manner may allow one user to listen to music in the listening zone in one area of the living room space, and another user to watch the television in another area of the living room space. In a related example, a user may utilize either of the NMD 103a or 103b (FIG. 1B) to control the Den zone before it is separated into the television zone and the listening zone. Once separated, the listening zone may be controlled, for example, by a user in the vicinity of the NMD 103a, and the television zone may be controlled, for example, by a user in the vicinity of the NMD 103b. As described above, however, any of the NMDs 103 may be configured to control the various playback and other devices of the MPS 100.

c. Example Controller Devices

FIG. 4A is a functional block diagram illustrating certain aspects of a selected one of the controller devices 104 of the MPS 100 of FIG. 1A. Such controller devices may also be referred to herein as a "control device" or "controller." The controller device shown in FIG. 4A may include components that are generally similar to certain components of the network devices described above, such as a processor 412, memory 413 storing program software 414, at least one network interface 424, and one or more microphones 422. In one example, a controller device may be a dedicated controller for the MPS 100. In another example, a controller device may be a network device on which media playback system controller application software may be installed, such as for example, an iPhone™, iPad™ or any other smart phone, tablet, or network device (e.g., a networked computer such as a PC or Mac™).

The memory 413 of the controller device 104 may be configured to store controller application software and other data associated with the MPS 100 and/or a user of the system 100. The memory 413 may be loaded with instructions in software 414 that are executable by the processor 412 to achieve certain functions, such as facilitating user access, control, and/or configuration of the MPS 100. The controller device 104 is configured to communicate with other network devices via the network interface 424, which may take the form of a wireless interface, as described above.

In one example, system information (e.g., such as a state variable) may be communicated between the controller device 104 and other devices via the network interface 424. For instance, the controller device 104 may receive playback zone and zone group configurations in the MPS 100 from a playback device, an NMD, or another network device. Likewise, the controller device 104 may transmit such system information to a playback device or another network device via the network interface 424. In some cases, the other network device may be another controller device.

The controller device 104 may also communicate playback device control commands, such as volume control and audio playback control, to a playback device via the network interface 424. As suggested above, changes to configurations of the MPS 100 may also be performed by a user using the controller device 104. The configuration changes may include adding/removing one or more playback devices to/from a zone, adding/removing one or more zones to/from a zone group, forming a bonded or merged player, separating one or more playback devices from a bonded or merged player, among others.

As shown in FIG. 4A, the controller device 104 also includes a user interface 440 that is generally configured to facilitate user access and control of the MPS 100. The user interface 440 may include a touch-screen display or other physical interface configured to provide various graphical controller interfaces, such as the controller interfaces 440a and 440b shown in FIGS. 4B and 4C. Referring to FIGS. 4B and 4C together, the controller interfaces 440a and 440b includes a playback control region 442, a playback zone region 443, a playback status region 444, a playback queue region 446, and a sources region 448. The user interface as shown is just one example of an interface that may be provided on a network device, such as the controller device shown in FIG. 4A, and accessed by users to control a media playback system, such as the MPS 100. Other user interfaces of varying formats, styles, and interactive sequences may alternatively be implemented on one or more network devices to provide comparable control access to a media playback system.

The playback control region 442 (FIG. 4B) may include selectable icons (e.g., by way of touch or by using a cursor) that, when selected, cause playback devices in a selected playback zone or zone group to play or pause, fast forward, rewind, skip to next, skip to previous, enter/exit shuffle mode, enter/exit repeat mode, enter/exit cross fade mode, etc. The playback control region 442 may also include selectable icons that, when selected, modify equalization settings and/or playback volume, among other possibilities.

The playback zone region 443 (FIG. 4C) may include representations of playback zones within the MPS 100. The playback zones regions 443 may also include a representation of zone groups, such as the Dining Room+Kitchen zone group, as shown. In some embodiments, the graphical representations of playback zones may be selectable to bring up additional selectable icons to manage or configure the playback zones in the MPS 100, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the MPS 100 to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface are also possible. The representations of playback zones in the playback zone region 443 (FIG. 4C) may be dynamically updated as playback zone or zone group configurations are modified.

The playback status region 444 (FIG. 4B) may include graphical representations of audio content that is presently being played, previously played, or scheduled to play next in the selected playback zone or zone group. The selected playback zone or zone group may be visually distinguished on a controller interface, such as within the playback zone region 443 and/or the playback status region 444. The graphical representations may include track title, artist name, album name, album year, track length, and/or other relevant information that may be useful for the user to know when controlling the MPS 100 via a controller interface.

The playback queue region 446 may include graphical representations of audio content in a playback queue associated with the selected playback zone or zone group. In some embodiments, each playback zone or zone group may be associated with a playback queue comprising information corresponding to zero or more audio items for playback by the playback zone or zone group. For instance, each audio item in the playback queue may comprise a uniform resource identifier (URI), a uniform resource locator (URL), or some other identifier that may be used by a playback device in the playback zone or zone group to find and/or retrieve the audio item from a local audio content source or a networked audio content source, which may then be played back by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streamed audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue or may be associated with a new playback queue that is empty or contains audio items from the playback queue associated with the established zone group before the established zone group was ungrouped. Similarly, the resulting second playback zone may be re-associated with the previous second playback queue or may be associated with a new playback queue that is empty or contains audio items from the playback queue associated with the established zone group before the established zone group was ungrouped. Other examples are also possible.

With reference still to FIGS. 4B and 4C, the graphical representations of audio content in the playback queue region 446 (FIG. 4B) may include track titles, artist names, track lengths, and/or other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. Playback of such a playback queue may involve one or more playback devices playing back media items of the queue, perhaps in sequential or random order.

The sources region 448 may include graphical representations of selectable audio content sources and/or selectable voice assistants associated with a corresponding VAS. The VASes may be selectively assigned. In some examples, multiple VASes, such as AMAZON's Alexa, MICROSOFT's Cortana, etc., may be invokable by the same NMD. In some embodiments, a user may assign a VAS exclusively to one or more NMDs. For example, a user may assign a first VAS to one or both of the NMDs 102*a* and 102*b* in the Living Room shown in FIG. 1A, and a second VAS to the NMD 103*f* in the Kitchen. Other examples are possible.

d. Example Audio Content Sources

The audio sources in the sources region 448 may be audio content sources from which audio content may be retrieved and played by the selected playback zone or zone group. One or more playback devices in a zone or zone group may be configured to retrieve for playback audio content (e.g., according to a corresponding URI or URL for the audio content) from a variety of available audio content sources. In one example, audio content may be retrieved by a playback device directly from a corresponding audio content source (e.g., via a line-in connection). In another example, audio content may be provided to a playback device over a network via one or more other playback devices or network devices. As described in greater detail below, in some embodiments audio content may be provided by one or more media content services.

Example audio content sources may include a memory of one or more playback devices in a media playback system such as the MPS 100 of FIG. 1, local music libraries on one or more network devices (e.g., a controller device, a network-enabled personal computer, or a networked-attached storage ("NAS")), streaming audio services providing audio content via the Internet (e.g., cloud-based music services), or audio sources connected to the media playback system via a line-in input connection on a playback device or network device, among other possibilities.

In some embodiments, audio content sources may be added or removed from a media playback system such as the MPS 100 of FIG. 1A. In one example, an indexing of audio items may be performed whenever one or more audio content sources are added, removed, or updated. Indexing of audio items may involve scanning for identifiable audio items in all folders/directories shared over a network accessible by playback devices in the media playback system and generating or updating an audio content database comprising metadata (e.g., title, artist, album, track length, among others) and other associated information, such as a URI or URL for each identifiable audio item found. Other examples for managing and maintaining audio content sources may also be possible.

e. Example Network Microphone Devices

Figure 5:
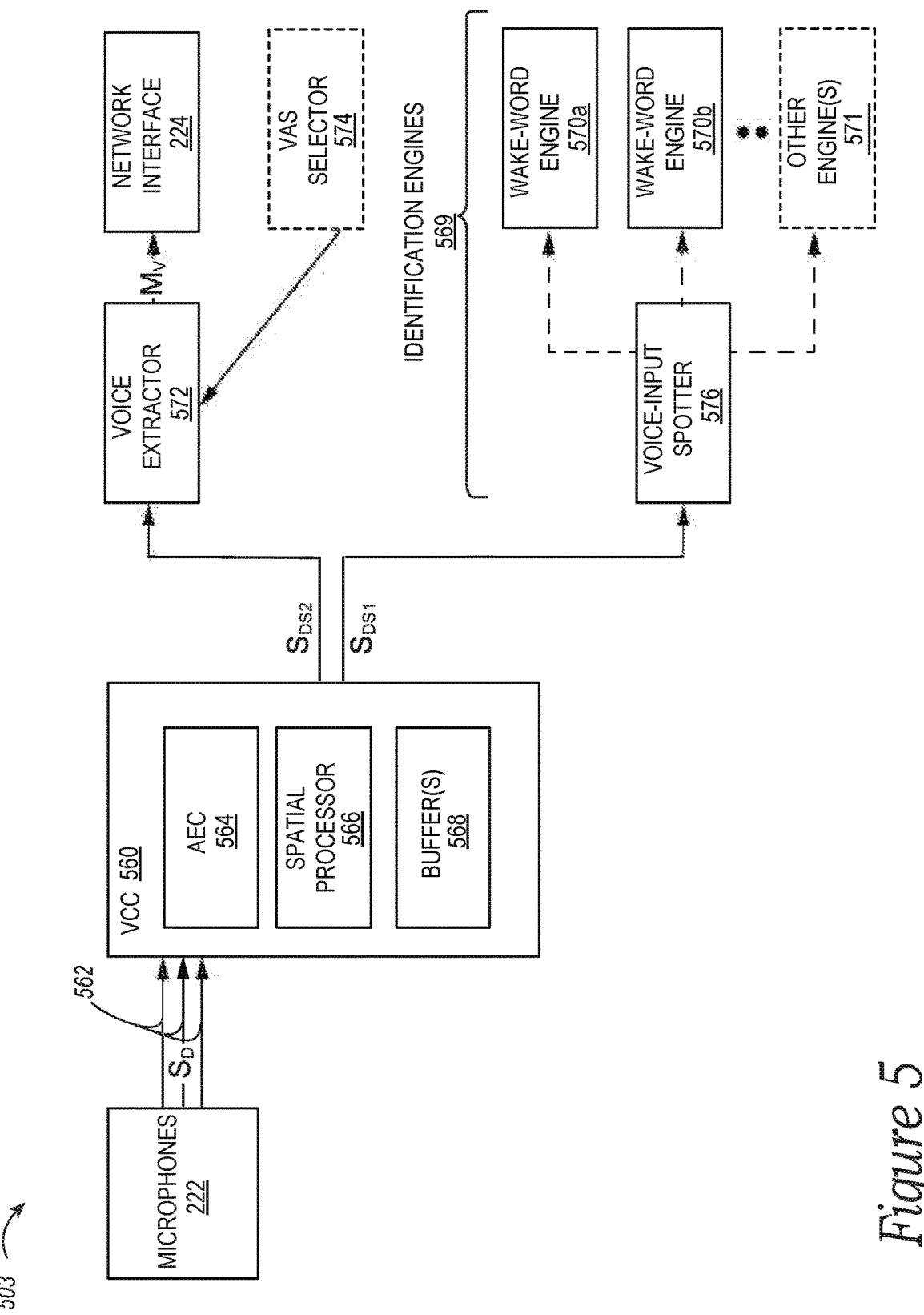
FIG. 5 is a functional block diagram of certain components of an example network microphone device in accordance with aspects of the disclosure.

FIG. 5 is a functional block diagram showing an NMD 503 configured in accordance with embodiments of the disclosure. The NMD 503 includes voice capture components ("VCC") 560 a plurality of identification engines 569 and at least one voice extractor 572, each of which is operably coupled to the VCC 560. The NMD 503 further includes the microphones 222 and the at least one network interface 224 described above and may also include other components, such as audio amplifiers, speakers, a user interface, etc., which are not shown in FIG. 5 for purposes of clarity.

The microphones 222 of the NMD 503 are configured to provide detected sound, $S_D$, from the environment of the NMD 503 to the VCC 560. The detected sound $S_D$ may take the form of one or more analog or digital signals. In example implementations, the detected sound $S_D$ may be composed of a plurality signals associated with respective channels 562 that are fed to the VCC 560.

Each channel 562 may correspond to a particular microphone 222. For example, an NMD having six microphones may have six corresponding channels. Each channel of the detected sound $S_D$ may bear certain similarities to the other channels but may differ in certain regards, which may be due to the position of the given channel's corresponding microphone relative to the microphones of other channels. For example, one or more of the channels of the detected sound $S_D$ may have a greater signal to noise ratio ("SNR") of speech to background noise than other channels.

As further shown in FIG. 5, the VCC 560 includes an AEC 564, a spatial processor 566, and one or more buffers 568. In operation, the AEC 564 receives the detected sound $S_D$ and filters or otherwise processes the sound to suppress echoes and/or to otherwise improve the quality of the detected sound $S_D$. That processed sound may then be passed to the spatial processor 566.

The spatial processor 566 is typically configured to analyze the detected sound $S_D$ and identify certain characteristics, such as a sound's amplitude (e.g., decibel level), frequency spectrum, directionality, etc. In one respect, the spatial processor 566 may help filter or suppress ambient noise in the detected sound $S_D$ from potential user speech based on similarities and differences in the constituent channels 562 of the detected sound Sp, as discussed above. As one possibility, the spatial processor 566 may monitor metrics that distinguish speech from other sounds. Such metrics can include, for example, energy within the speech band relative to background noise and entropy within the speech band-a measure of spectral structure-which is typically lower in speech than in most common background noise. In some implementations, the spatial processor 566 may be configured to determine a speech presence probability, examples of such functionality are disclosed in U.S. patent application Ser. No. 15/984,073, filed May 18, 2018, titled "Linear Filtering for Noise-Suppressed Speech Detection," which is incorporated herein by reference in its entirety.

In operation, the one or more buffers 568—one or more of which may be part of or separate from the memory 213 (FIG. 2A)—capture data corresponding to the detected sound $S_D$. More specifically, the one or more buffers 568 capture detected-sound data that was processed by the upstream AEC 564 and spatial processor 566.

In general, the detected-sound data form one or more digital representations (i.e., one or more sound-data streams), $S_{DS}$, (identified individually as a first sound data stream $S_{DS1}$ and a second sound data stream $S_{DS2}$ in FIG. 5) of the sound detected by the microphones 222. In practice, the sound-data stream $S_{DS}$ may take a variety of forms. As one possibility, a sound-data stream $S_{DS}$ may be composed of frames, each of which may include one or more sound samples. The frames may be streamed (i.e., read out) from the one or more buffers 568 for further processing by downstream components, such as the identification engines 569 and the voice extractor 572 of the NMD 503. Further, a sound-data stream may be passed to various downstream components in similar, albeit different forms, such as the first sound data stream $S_{DS1}$ (which may include a certain amount of sound data for spotting keywords or wake words) being passed to the identification engines 569, and the second sound data stream $S_{DS2}$ (which may include the sound data sent in the sound data stream $S_{DS1}$ and/or additional sound data) being passed to the voice extractor 572 such as upon spotting a keyword and/or in response to wake-word detection or other event.

In some implementations, at least one buffer 568 captures detected-sound data utilizing a sliding window approach in which a given amount (i.e., a given window) of the most recently captured detected-sound data is retained in the at least one buffer 568 while older detected-sound data are overwritten when they fall outside of the window. For example, at least one buffer 568 may temporarily retain 20 frames of a sound specimen at given time, discard the oldest frame after an expiration time, and then capture a new frame, which is added to the 19 prior frames of the sound specimen.

In practice, when the sound-data stream $S_{DS}$ is composed of frames, the frames may take a variety of forms having a variety of characteristics. As one possibility, the frames may take the form of audio frames that have a certain resolution (e.g., 16 bits of resolution), which may be based on a sampling rate (e.g., 44,100 Hz). Additionally, or alternatively, the frames may include information corresponding to a given sound specimen that the frames define, such as metadata that indicates frequency response, power input level, SNR, microphone channel identification, and/or other information of the given sound specimen, among other examples. Thus, in some embodiments, a frame may include a portion of sound (e.g., one or more samples of a given sound specimen) and metadata regarding the portion of sound. In other embodiments, a frame may only include a portion of sound (e.g., one or more samples of a given sound specimen) or metadata regarding a portion of sound.

In any case, downstream components of the NMD 503 may process the sound-data stream $S_{DS}$. For instance, identification engines 569 can be configured to apply one or more identification algorithms to the sound-data stream $S_{DS}$ (e.g., streamed sound frames) to spot potential wake words in the detected-sound $S_D$. The identification engines 569 include a voice-input spotter 576 (e.g., a keyword spotter), a first wake-word engine 570a, a second wake-word engine 570b, and optionally other engines 571a as described in more detail below with respect to FIG. 7. When the identification engines 569 spot a potential wake word, one or more of the identification engines 569 can output an indication of a "wake-word event" (also referred to as a "wake-word trigger").

In some implementations, a wake-word event indicated by the voice-input spotter 576 may cause one or more of the downstream wake-word engines (e.g., the wake-word engine(s) 570a, 570b, and/or other engine(s) 571) to transition from a disabled state to an enabled state, as described in greater detail below. Further, a wake-word event may initiate voice extraction via the voice extractor 572, such as when one of the downstream wake-word engines spots a wake word after the initial voice-input spotter stage. For instance, if the first wake-word engine 570a is affiliated with a VAS, such as a GOOGLE VAS, it may indicate a wake-word event based on an algorithm utilized for this service and directing voice extraction to an appropriate remote server. On the other hand, if the second wake-word engine 570b, which may be affiliated, e.g., with an ALEXA VAS, detects a wake word based on its respective algorithm, it may direct voice extraction to a different VAS than the first wake-word engine 570a. In some implementations, a voice-input spotter, such as a keyword spotter, may run an algorithm (based, e.g., on a particular configuration of a neural network) that detects a broader spectrum of wake words, while a downstream wake-word engine may target a smaller set of keywords affiliated with a particular service. In various embodiments, two or more of the identification engines, such as two or more of the downstream wake-word engines may perform voice-input (e.g., wake-word) detection concurrently (or substantially concurrently).

In response to the wake-word event (e.g., in response to a signal from the identification engines 569 indicating the wake-word event), the voice extractor 572 is configured to receive and format (e.g., packetize) the sound-data stream $S_{DS}$. For instance, the voice extractor 572 packetizes the frames of the sound-data stream $S_{DS}$ into messages. The voice extractor 572 transmits or streams these messages, $M_V$; that may contain voice input in real time or near real time to a remote VAS, such as the VAS 190 (FIG. 1B), via the network interface 224.

Figure 6A:
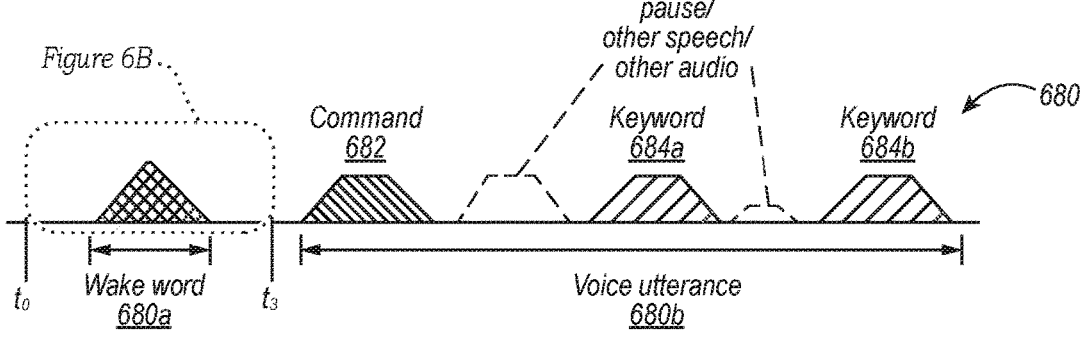
FIG. 6A is a diagram of an example voice input.

The VAS is configured to process the sound-data stream $S_{DS}$ contained in the messages $M_V$ sent from the NMD 503. More specifically, the VAS is configured to identify voice input based on the sound-data stream $S_{DS}$. Referring to FIG. 6A, a voice input 680 may include a wake word portion 680a and an utterance portion 680b. The wake word portion 680a corresponds to detected sound that caused the wake-word event. For instance, the wake word portion 680a corresponds to detected sound that caused the identification engines 569 to provide an indication of a wake-word event to the voice extractor 572. The utterance portion 680b corresponds to detected sound that potentially comprises a user request following the wake word portion 680a.

Figure 6B:
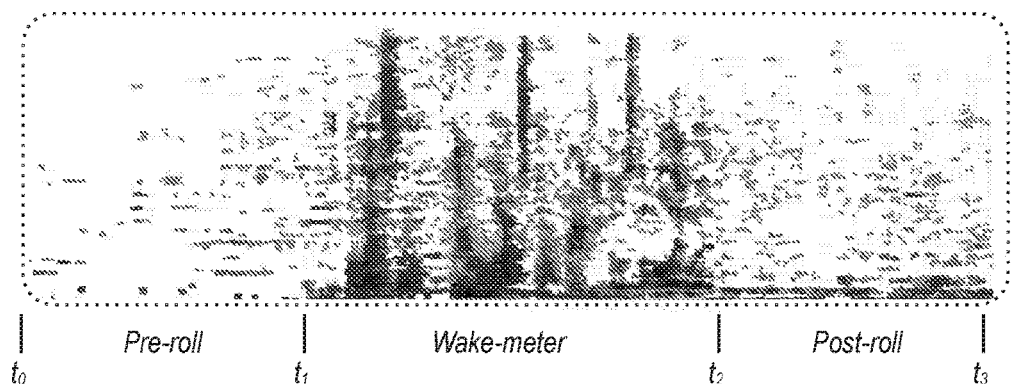
FIG. 6B is a graph depicting an example sound specimen in accordance with aspects of the disclosure.

As an illustrative example, FIG. 6B shows an example first sound specimen. In this example, the sound specimen corresponds to the sound-data stream $S_{DS}$ (e.g., one or more audio frames) associated with the spotted wake word 680a of FIG. 6A. As illustrated, the example first sound specimen comprises sound detected in the playback device 102i's environment (i) immediately before a wake word was spoken, which may be referred to as a pre-roll portion (between times $t_0$ and $t_1$), (ii) while the wake word was spoken, which may be referred to as a wake-meter portion (between times $t_1$ and $t_2$), and/or (iii) after the wake word was spoken, which may be referred to as a post-roll portion (between times $t_2$ and $t_3$). Other sound specimens are also possible.

Typically, the VAS may first process the wake word portion 680a within the sound-data stream $S_{DS}$ to verify the presence of the wake word. In some instances, the VAS may determine that the wake word portion 680a comprises a false wake word (e.g., the word "Election" when the word "Alexa" is the target wake word). In such an occurrence, the VAS may send a response to the NMD 503 (FIG. 5) with an indication for the NMD 503 to cease extraction of sound data, which may cause the voice extractor 572 to cease further streaming of the detected-sound data to the VAS. One or more of the identification engines 569 (e.g., the voice-input spotter 576) may resume or continue monitoring sound specimens until another potential wake-word detection, leading to another wake-word event. In some implementations, the VAS may not process or receive the wake word portion 680a but instead processes only the utterance portion 680b.

In any case, the VAS processes the utterance portion 680b to identify the presence of any words in the detected-sound data and to determine an underlying intent from these words. The words may correspond to a certain command 682 and certain keywords 684 (identified individually in FIG. 6A as a first keyword 684a and a second keyword 684b). The keywords 684 of the voice utterance portion 680b are not to be confused with keywords of the wake word portion 680a. A wake-word keyword may be, for example, a word in the voice input 680 that triggers a wake-word event. A voice-utterance keyword 684 may indicate, e.g., how or where the command 682 is to be executed or provide other content. For example, a voice-utterance keyword may be a word in the voice input 680 identifying a particular device or group in the MPS 100. As other example possibilities, the keywords 684 may be one or more words identifying one or more zones in which the music is to be played, such as the Living Room and the Dining Room (FIG. 1A).

To determine the intent of the words, the VAS is typically in communication with one or more databases associated with the VAS (not shown) and/or one or more databases (not shown) of the MPS 100. Such databases may store various user data, analytics, catalogs, and other information for natural language processing and/or other processing. In some implementations, such databases may be updated for adaptive learning and feedback for a neural network based on voice-input processing. In some cases, the utterance portion 680b may include additional information, such as detected pauses (e.g., periods of non-speech) between words spoken by a user, as shown in FIG. 6A. The pauses may demarcate the locations of separate commands, keywords, or other information spoke by the user within the utterance portion 680b.

Based on certain command criteria, the VAS may take actions as a result of identifying one or more commands in the voice input, such as the command 682. Command criteria may be based on the inclusion of certain keywords within the voice input, among other possibilities. Additionally, or alternatively, command criteria for commands may involve identification of one or more control-state and/or zone-state variables in conjunction with identification of one or more particular commands. Control-state variables may include, for example, indicators identifying a level of volume, a queue associated with one or more devices, and playback state, such as whether devices are playing a queue, paused, etc. Zone-state variables may include, for example, indicators identifying which, if any, zone players are grouped.

After processing the voice input, the VAS may send a response to the MPS 100 with an instruction to perform one or more actions based on an intent it determined from the voice input. For example, based on the voice input, the VAS may direct the MPS 100 to initiate playback on one or more of the playback devices 102, control one or more of these devices (e.g., raise/lower volume, group/ungroup devices, etc.), turn on/off certain smart devices, among other actions. After receiving the response from the VAS, one or more of the identification engines 569 of the NMD 503 may resume or continue to monitor the sound-data stream $S_{DS}$ until it spots another potential wake word, as discussed above.

Referring back to FIG. 5, in multi-VAS implementations, the NMD 503 may include a VAS selector 574 (shown in dashed lines) that is generally configured to direct the voice extractor's extraction and transmission of the sound-data stream $S_{DS}$ to the appropriate VAS when a given wake word is identified by a particular wake-word engine, such as the first wake-word engine 570a, the second wake-word engine 570b, or the additional wake-word engine 571. In such implementations, the NMD 503 may include multiple, different wake-word engines and/or voice extractors, each supported by a particular VAS. Similar to the discussion above, each wake-word engine may be configured to receive as input the sound-data stream $S_{DS}$ from the one or more buffers 568 and apply identification algorithms to cause a wake-word trigger for the appropriate VAS. Thus, as one example, the first wake-word engine 570a may be configured to identify the wake word "Alexa" and cause the NMD 503 to invoke the AMAZON VAS when "Alexa" is spotted. As another example, the second wake-word engine 570b may be configured to identify the wake word "Ok, Google" and cause the NMD 503 to invoke the GOOGLE VAS when "Ok, Google" is spotted. In single-VAS implementations, the VAS selector 574 may be omitted.

In additional or alternate implementations, the NMD 503 may include other voice-input identification engines 571 (shown in dashed lines) that enable the NMD 503 to operate without the assistance of a remote VAS. As an example, such an engine may identify in detected sound certain commands (e.g., "play," "pause," "turn on," etc.) and/or certain keywords or phrases, such as the unique name assigned to a given playback device (e.g., "Bookcase," "Patio," "Office," etc.). In response to identifying one or more of these commands, keywords, and/or phrases, the NMD 503 may communicate a signal (not shown in FIG. 5) that causes the audio processing components 216 (FIG. 2A) to perform one or more actions. For instance, when a user says "Hey Sonos, stop the music in the office," the NMD 503 may communicate a signal to the office playback device 102n, either directly, or indirectly via one or more other devices of the MPS 100, which causes the office device 102n to stop audio playback. Reducing or eliminating the need for assistance from a remote VAS may reduce latency that might otherwise occur when processing voice input remotely. In some cases, the identification algorithms employed may be configured to identify commands that are spoken without a preceding wake word. For instance, in the example above, the NMD 503 may employ an identification algorithm that triggers an event to stop the music in the office without the user first saying "Hey Sonos" or another wake word.

III. Example Systems and Methods for Two-Stage Detection of Wake Words

As shown in FIG. 5, the identification engines 569 of the NMD 503 include a voice-input spotter 576 upstream of first and second wake-word engines 570a and 570b as well as another other voice-input identification engine 571 discussed above. In operation, the sound-data stream $S_{DS}$ is passed from the VCC 560 to the voice-input spotter 576. The voice-input spotter 576 analyzes the sound-data stream $S_{DS}$ to detect keywords such as wake words or commands. As described in more detail below, in some embodiments the voice-input spotter 576 identifies candidate keywords in the sound-data stream $S_{DS}$. In response to spotting one or more keywords or candidate keywords in the sound-data stream $S_{DS}$, the voice-input spotter 576 also selects an appropriate output to provide the sound-data stream $S_{DS}$ for additional processing. As illustrated, the voice-input spotter 576 can pass the sound-data stream $S_{DS}$ to a first wake-word engine 570a, a second wake-word engine 570b, and/or another engine 571 configured for local device function. In some embodiments, the output destination is determined based on the keyword spotted via the voice-input spotter 576 in the sound-data stream $S_{DS}$.

In some embodiments, the voice-input spotter 576 can perform a first algorithm on the sound-data stream $S_{DS}$ to identify a preliminary or candidate wake word in the voice input. This first algorithm can be less computationally complex and/or consume less memory than the downstream algorithms used by the first and/or second wake-word engines 570a and 570b. In some examples, the first algorithm is used to determine whether the voice input includes one wake word from among a plurality of possible wake words, such as "Alexa," "Ok Google," and "Hey, Siri."

In some embodiments, the voice-input spotter 576 is configured to assign a probability score or range to a candidate wake word in the sound-data stream $S_{DS}$. For example, the first algorithm might indicate an 80% probability that the wake word "OK, Google" has been detected in the sound-data stream $S_{DS}$, in which case "OK, Google" may be identified as a candidate or preliminary wake word. In some embodiments, the identified candidate wake word requires a certain minimum threshold probability score. For example, wake words identified with 60% or greater probability may be identified as candidate wake words, while wake words identified with less than 60% probability may not be identified as candidate wake words. The particular threshold can be varied in different embodiments, for example greater than 50%, 60%, 70%, 80%, or 90% probability. In some embodiments, within a single sound-data stream $S_{DS}$, two different wake words may each be assigned a probability score or range such that each is identified as a candidate wake word.

The first algorithm employed by the voice-input spotter 576 can include various keyword spotting algorithms now known or later developed, or variations thereof. In some embodiments, the first algorithm uses a neural network for keyword spotting, such as deep neural networks (DNNs), convolutional neural networks (CNNs), or recurrent neural networks (RNNs) to model the keywords based on large amounts of keyword-specific training data. In some embodiments, the neural network utilized by the voice-input spotter 576 has been compressed to achieve significant reductions in computational complexity and/or memory requirements for the neural network. This enables the neural network to be stored locally on an NMD or playback device without excessive power or memory consumption. Additional details regarding compression of neural networks for wake-word detection are described below with respect to FIGS. 8-10.

Based on the preliminary detection of a wake word via the voice-input spotter 576, the sound-data stream $S_{DS}$ can be passed to an appropriate wake-word engine such as first wake-word engine 570a or second wake-word engine 570b, or the voice input can be passed to another engine 571 configured for local device function. In some embodiments, the first and second wake-word engines 570a and 570b can be associated with different voice assistant services. For example, first wake-word engine 570a can be associated with AMAZON voice assistant services, and the second wake-word engine 570b can be associated with GOOGLE voice assistant services. Still other wake-word engines not shown here may be included, for example a third wake-word engine associated with APPLE voice services, etc. Each of these wake-word engines may be enabled (e.g., powered up) and disabled (e.g., powered down) in response to a determination by the voice-input spotter 576. As a result, a particular wake-word engine may be enabled and activated only when selected by the voice-input spotter 576.

Each of the wake-word engines 570a and 570b is configured to analyze a sound-data stream $S_{DS}$ received from the voice-input spotter 576 to detect a confirmed wake word.

The confirmed wake word can be the same wake word previously identified by the voice-input spotter 576. In some embodiments, the first or second wake-word engine 570*a* or 570*b* (depending on which was selected) has a higher accuracy and therefore a higher confidence in the detected wake word. The first and second wake-word engines 570*a* and 570*b* can use more computationally intensive algorithm (s) for detecting the confirmed wake word. In one example, the voice-input spotter 576 identifies a candidate wake word of "Alexa" and then selects the first wake-word engine 570*a*, which is associated with AMAZON voice services, for further processing of the voice input. Next, the first wake-word engine 570*a* analyzes the voice input to confirm or disconfirm the presence of the wake word "Alexa" in the voice input. If the wake word is confirmed, then the NMD 503 can pass additional data of the sound-data stream $S_{DS}$ (e.g., the voice utterance portion 680*b* of FIG. 6A) to the appropriate voice assistant service for further processing as described above. If the wake word is disconfirmed, then the NMD 503 may take no further action with respect to that particular sound-data stream $S_{DS}$, or the NMD 503 may provide an alert or other output indicating that a preliminary wake word was disconfirmed by the first wake-word engine 570*a*.

As noted above, the various wake-word engines 570*a* and 570*b* can each be associated with different voice services. Such wake-word engines may utilize different algorithms for identifying confirmed wake words in the voice input, whether now known or later developed, or variations thereof. Examples of such algorithms include, but are not limited to, (i) the sliding window model, in which features within a sliding time-interval of the captured audio are compared to keyword models, (ii) the garbage model, in which a Hidden Markov Model (HMM) is constructed for each keyword as well as for non-keywords, such that the non-keyword models are used to help distinguish non-keyword speech from keyword speech, (iii) the use of Large Vocabulary Continuous Speech Recognition (LVCSR), in which input speech is decoded into lattices that are searched for predefined keywords, and (iv) the use of neural networks, such as deep neural networks (DNNs), convolutional neural networks (CNNs), or recurrent neural networks (RNNs) to model the keywords based on large amounts of keyword-specific training data.

As previously noted, in some embodiments the voice-input spotter 576 can pass the sound-data stream $S_{DS}$ to another engine 571 instead of or in addition to passing the sound-data stream $S_{DS}$ to the first and/or second wake-word engines 570*a* and 570*b*. If the voice-input spotter 576 identifies a keyword such as a local device command in the sound-data stream $S_{DS}$, then the voice-input spotter 576 can pass this input to the other engine 571 for the command to be carried out. As one example, if the voice-input spotter 576 detects the keywords "turn up the volume," the voice-input spotter 576 may pass the sound-data stream $S_{DS}$ to the other engine 571. In various embodiments, the other engine 571 can include components configured to carry out any number of different functions, such as modifying playback volume, track control (pausing, skipping, repeating, etc.), device grouping or ungrouping, de-activating microphones, or any other local device function. In some embodiments, the other engine 571 is limited to performing functions on the particular NMD that received the sound-data stream $S_{DS}$. In other embodiments, the other engine 571 can cause functions to be performed on other playback devices or NMDs in communication with the NMD that received the sound-data stream $S_{DS}$.

a. Example Two-Stage Detection of Wake Words

Figure 7:
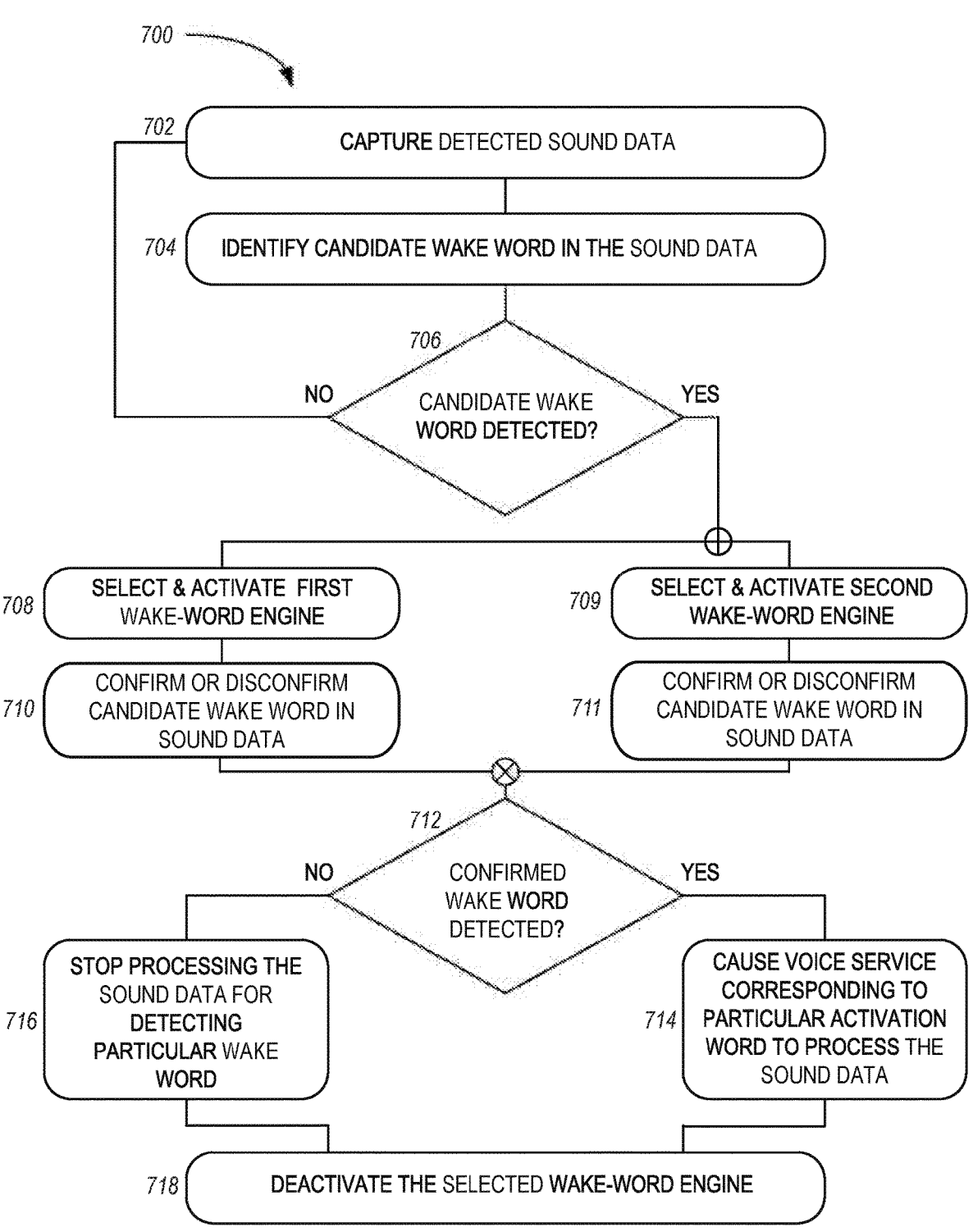
FIG. 7 is a flow chart of an example method for two-stage wake-word detection in accordance with aspects of the disclosure.

As discussed above, in some examples, an NMD is configured to monitor and analyze received audio to determine if any wake words are present in the received audio. FIG. 7 shows an example embodiment of a method 700 for an NMD to determine if any wake words are present in the received audio. Method 700 can be implemented by any of the NMDs disclosed and/or described herein, or any other NMD now known or later developed.

Various embodiments of method 700 include one or more operations, functions, and actions illustrated by blocks 702 through 718. Although the blocks are illustrated in sequential order, these blocks may also be performed in parallel, and/or in a different order than the order disclosed and described herein. Also, the various blocks may be combined into fewer blocks, divided into additional blocks, and/or removed based upon a desired implementation.

Method 700 begins at block 702, which involves the NMD capturing detected sound data via one or more microphones. The captured sound data includes sound data from an environment of the NMD and, in some embodiments, includes a voice input, such as voice input 680 depicted in FIG. 6A.

At block 704, method 700 involves the NMD using a first algorithm to identify a candidate wake word in the sound data. The candidate wake word can be one from among a plurality of possible wake words, and in some each wake word of the plurality of wake words corresponds to a respective voice service of a plurality of voice services. In some embodiments, this involves the NMD causing the voice-input spotter 576 described above in connection with FIG. 5 to utilize a wake-word detection algorithm to detect the candidate wake word. Additionally, in some embodiments, the plurality of wake words includes one or more of (i) the wake word "Alexa" corresponding to AMAZON voice services, (ii) the wake word "Ok, Google" corresponding to GOOGLE voice services, or (iii) the wake word "Hey, Siri" corresponding to APPLE voice services. Accordingly, in some examples, using the first algorithm to perform the first wake-word detection process involves the NMD using the first algorithm to determine whether the captured sound data includes multiple wake words, such as "Alexa," "Ok, Google," and "Hey, Siri." Further, in some examples, the NMD uses the first algorithm in parallel to determine concurrently whether the captured sound data includes the multiple wake words.

Additionally, in some embodiments, the plurality of wake words includes one or more of (i) the wake word "Alexa" corresponding to AMAZON voice services, (ii) the wake word "Ok, Google" corresponding to GOOGLE voice services, or (iii) the wake word "Hey, Siri" corresponding to APPLE voice services. Accordingly, in some examples, using the first algorithm to perform the first wake-word detection process involves the NMD using the first algorithm to determine whether the captured sound data includes multiple wake words, such as "Alexa," "Ok, Google," and "Hey, Siri." Further, in some embodiments, the NMD uses the first algorithm in parallel to determine concurrently whether the captured sound data includes the multiple wake words.

In some embodiments, identifying a candidate wake word includes assigning a probability score or range with one or more wake words. For example, the first algorithm might indicate a 70% probability that the wake word "Alexa" has been detected in the voice input, in which case "Alexa" may be deemed a candidate wake word. In some embodiments, two different wake words may each be assigned a probability score or range such that each is identified as a candidate wake word.

As noted above, the first algorithm employed in block 704 to identify candidate wake words can include various keyword spotting algorithms now known or later developed, or variations thereof. In some embodiments, the first algorithm uses a neural network for keyword spotting, such as deep neural networks (DNNs), convolutional neural networks (CNNs), or recurrent neural networks (RNNs) to model the keywords based on large amounts of keyword-specific training data. In some embodiments, the neural network utilized in block 704 has been compressed to achieve significant reductions in computational complexity and/or memory requirements for the neural network. This enables the neural network to be stored locally on an NMD or playback device without excessive power or memory consumption. Additional details regarding compression of neural networks for wake-word detection are described below with respect to FIGS. 8-10.

At block 706, method 700 involves the NMD determining whether any candidate wake words have been detected in the sound data in block 704. If the NMD did not identify any of the multiple wake words in the captured sound data as candidates, then method 700 returns to block 702, and the NMD continues to capture additional sound data and process that additional sound data using the first algorithm to identify any candidate wake words in the sound data. Alternatively, if the NMD did identify a particular wake word using the first algorithm, then method 700 advances to block 708 where the NMD attempts to confirm whether the candidate wake word is present in the captured sound data.

Responsive to the identification of a candidate wake word in the sound data, the NMD selects and activates either a first wake-word engine in block 708 or a second wake-word engine in block 709. In some embodiments, activating the first wake-word engine involves the NMD powering up (e.g., from a low power or no power state to a high-power state) or otherwise enabling the particular wake-word engine components to analyze the captured sound data.

The selection between the first wake-word engine and the second wake-word engine can be made based on the particular candidate wake word detected in the sound data in block 704. For example, the first wake-word engine can be associated with a first VAS and the second wake-word engine can be associated with a second VAS. If the candidate wake word is associated with the first VAS, then the first wake-word engine is selected and activated in block 708. If, instead, the candidate wake word is associated with the second VAS, then the second wake-word engine is selected and activated in block 709.

In one example, the first wake-word engine is configured to detect the wake word "Alexa," such that if the NMD determines at block 706 that the preliminary wake-word detection process detected the word "Alexa" as a candidate wake word, then the NMD responsively activates the first wake-word engine at block 708 and confirms or disconfirms the presence of the candidate wake word "Alexa" in the sound data in block 710. In the same or another example, the second wake-word engine is configured to detect the wake word "Ok Google," such that if the NMD determines at block 706 that the preliminary wake word identified in block 704 is "Ok Google," then the NMD responsively activates the second wake-word engine at block 709 and confirms or disconfirms the presence of "OK Google" in the sound data in block 711. In some embodiments, method 700 involves using additional wake-word detection engines to perform additional wake-word detection processes. For instance, in some embodiments, method 700 involves using a respective wake-word detection engine for each wake word that the NMD is configured to detect.

At block 708, method 700 involves the NMD causing the first wake-word engine to analyze the sound data to confirm or disconfirm the presence of the candidate wake word in the sound data. If confirmed, the NMD can output a confirmed wake word. The confirmed wake word can be the same wake word previously identified as preliminary in block 704, except that the first wake-word engine can have a higher expected accuracy and therefore a higher confidence in the detected wake word. In some embodiments, the first wake-word engine can use a more computationally intensive algorithm for detecting the confirmed wake word than the first algorithm used to identify the candidate wake word. In one example, the first algorithm identified as a candidate wake word of "Alexa" in block 704, and in block 708, a wake-word engine associated with AMAZON voice services is selected. Then, in block 710, the AMAZON wake-word engine analyzes the sound data to confirm or disconfirm the presence of "Alexa" in the sound data. If the AMAZON wake-word engine identifies the wake word "Alexa," then it is identified as a confirmed wake word. In another example, the first algorithm identified as a candidate wake word "OK Google" in block 704, and in block 708 a wake-word engine associated with GOOGLE voice services is selected. Then, in block 710, the GOOGLE wake-word engine analyzes the sound data to confirm or disconfirm the presence of "Ok Google" in the sound data.

The algorithms described above in connection with preliminary wake-word detection and the downstream wake-word engines can include various keyword spotting algorithms now known or later developed, or variations thereof. Examples of keyword spotting algorithms include, but are not limited to, (i) the sliding window model, in which features within a sliding time-interval of the captured audio are compared to keyword models, (ii) the garbage model, in which a Hidden Markov Model (HMM) is constructed for each keyword as well as for non-keywords, such that the non-keyword models are used to help distinguish non-keyword speech from keyword speech, (iii) the use of Large Vocabulary Continuous Speech Recognition (LVCSR), in which input speech is decoded into lattices that are searched for predefined keywords, and (iv) the use of neural networks, such as deep neural networks (DNNs), convolutional neural networks (CNNs), or recurrent neural networks (RNNs) to model the keywords based on large amounts of keyword-specific training data. Additional details regarding the use of neural networks are described below with respect to FIGS. 8-10.

At block 712, method 700 involves determining whether a confirmed wake word has been detected in the captured sound data. If a confirmed wake word has been detected in block 710 or block 711, then method 700 advances to block 714. And if no confirmed wake word has been detected in block 710 or block 711 (i.e., the preliminary wake word has been disconfirmed in block 710 or in block 711), then method 700 advances to block 716.

At block 714, method 700 involves the NMD causing, via its network interface, the respective voice service corresponding to the particular wake word to process the captured sound data. In some embodiments, this first involves identifying which respective voice service of the plurality of voice services corresponds to the particular wake word, examples of which are disclosed in U.S. patent application Ser. No. 15/229,868, incorporated by reference herein in its entirety.

In some embodiments, causing the respective voice service to process the captured sound data involves the NMD transmitting, via a network interface to one or more servers of the respective voice service, data representing the sound data and a command or query to process the data representing the sound data. The command or query may cause the respective voice service to process the voice command and may vary according to the respective voice service so as to conform the command or query to the respective voice service (e.g., to an API of the voice service).

As noted above, in some examples, the captured audio includes voice input 680, which in turn includes a first portion representing the wake word 680a and a second portion representing a voice utterance 680b, which can include one or more commands such as command 682. In some cases, the NMD may transmit only the data representing at least the second portion of the voice input (e.g., the portion representing the voice utterance 680b). By excluding the first portion, the NMD may reduce bandwidth needed to transmit the voice input 680 and avoid possible misprocessing of the voice input 680 due to the wake word 680a, among other possible benefits. Alternatively, the NMD may transmit data representing both portions of the voice input 680, or some other portion of the voice input 680.

In some embodiments, causing the respective voice service to process the captured sound data involves the NMD querying a wake-word detection algorithm corresponding to the respective voice service. As noted above, queries to the voice services may involve invoking respective APIs of the voice services, either locally on the NMD or remotely using a network interface. In response to a query to a wake-word detection algorithm of the respective voice service, the NMD receives a response indicating whether or not the captured sound data submitted in the query included the wake word corresponding to that voice service. When a wake-word detection algorithm of a specific voice service detects that the captured sound data includes the particular wake word corresponding to the specific voice service, the NMD may cause that specific voice service to further process the sound data, for instance, to identify voice commands in the captured sound data.

After causing the respective voice service to process the captured audio, the NMD receives results of the processing. For instance, if the detected sound data represents a search query, the NMD may receive search results. As another example, if the detected sound data represents a command to a device (e.g., a media playback command to a playback device), the NMD may receive the command and perhaps additional data associated with the command (e.g., a source of media associated with the command). The NMD may output these results as appropriate based on the type of command and the received results.

Alternatively, if the detected sound data includes a voice command directed to another device other than the NMD, the results might be directed to that device rather than to the NMD. For instance, referring to FIG. 1A, NMD 103f in the kitchen 101h may receive a voice input that was directed to playback device 102l of the dining room 101g (e.g., to adjust media playback by playback device 102l). In such an embodiment, although NMD 103f facilitates processing of the voice input, the results of the processing (e.g., a command to adjust media playback) may be sent to playback device 102l. Alternatively, the voice service may send the results to NMD 103f, which may relay the command to playback device 102l or otherwise cause playback device 102l to carry out the command.

At block 716, method 700 involves the NMD ceasing processing the captured sound data to detect the confirmed wake word responsive to the determining that the captured sound data does not include the particular wake word. In some embodiments, ceasing processing the captured sound data to detect the particular wake word involves the NMD further processing the captured sound data to determine whether the captured sound data includes a wake word different from the particular wake word. For instance, for each respective wake word of the plurality of wake words, the NMD can use one or more algorithms to determine whether the captured sound data includes the respective wake word.

Additionally or alternatively, in some embodiments, ceasing processing the captured sound data to detect the particular wake word does not involve the NMD ceasing processing the captured sound data completely. Instead, the NMD continues to listen for wake words by repeating method 700, for instance, by capturing additional sound data and performing the first and second wake-word detection processes on the additional captured sound data.

In any case, at block 718, method 700 involves the NMD deactivating the selected wake-word engine (i.e., the first and/or second wake-word engine, depending on which engine was previously selected and activated). Accordingly, in some examples, method 700 involves the NMD deactivating the selected wake-word engine after ceasing processing the sound data at block 716. And in other examples, method 700 involves the NMD deactivating the selected wake-word engine after causing the voice service to process the particular wake word at block 714. In line with the discussion above, in some embodiments, deactivating the selected wake-word engine involves the NMD powering down or otherwise disabling the wake-word engine components 570a and/or 570b from analyzing the captured sound data.

b. Examples of Compressing Neural Networks for Wake-Word Detection

Figure 8:
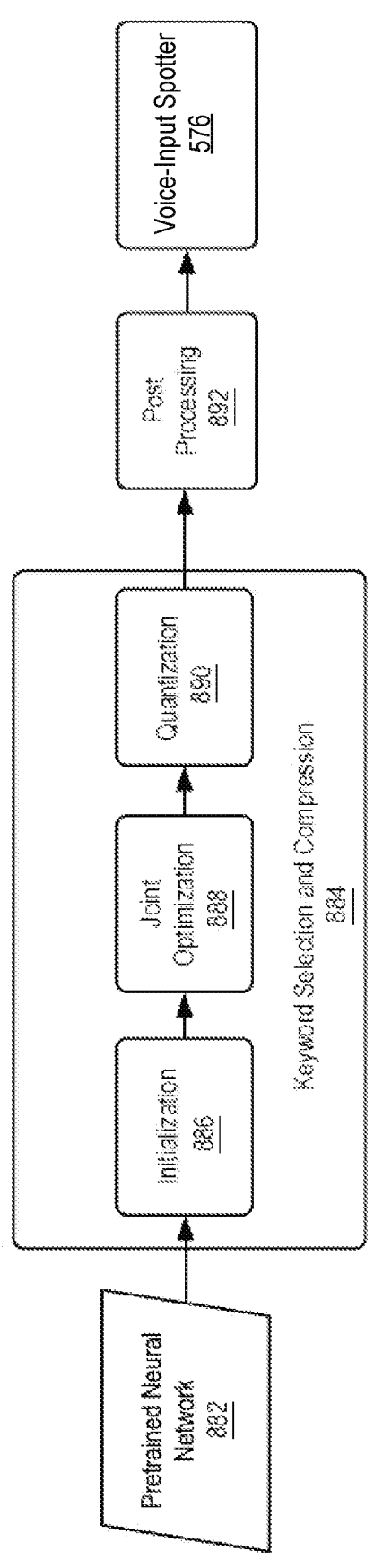
FIG. 8 a functional block diagram of a system for generating a model for keyword spotting and selection in accordance with aspects of the disclosure.

FIG. 8 a functional block diagram of a system 880 for generating a compressed neural network for keyword spotting and selection. As shown in FIG. 8, a pretrained neural network 882 is provided to a keyword selection and compression module 884. The pretrained neural network 882 can be, for example, a neural network such as a deep neural network (DNN), convolutional neural network (CNN), or recurrent neural network (RNN) that has modeled one or more selected keywords based on large amounts of keyword-specific training data. The keyword selection and compression module 884 can optimize and compress the pretrained neural network to provide a compressed neural network that performs better than the pretrained neural network input 882, for example being less computationally intensive and/or requiring less memory without significant decrease in accuracy of keyword detection.

As described in more detail below, the keyword selection and compression module 884 can retrain and compress the pretrained neural network 882 by compressing weights of the pretrained neural network to K clusters, for example by fitting a Gaussian mixture model (GMM) over the weights. This technique is known as soft-weight sharing, and can result in significant compression of a neural network. By fitting components of the GMM alongside the weights of the pretrained neural network, the weights tend to concentrate tightly around a number of cluster components, while the cluster centers optimize themselves to give the network high predictive accuracy. This results in high compression because the neural network needs only to encode K cluster means, rather than all the weights of the pretrained neural network. Additionally, one cluster may be fixed at 0 with high initial responsibility in the GMM, allowing for a sparse representation as discussed below with respect to FIG. 10.

At the initialization module 886 of the keyword selection and compression module 884, the components of the GMM are initialized. For example, the means of a predetermined number of non-fixed components can be distributed evenly over the range of the weights of the pretrained neural network 882. The variances may be initialized such that each Gaussian has significant probability mass in its respective region. In some embodiments, the weights of the neural network may also be initialized via the initialization module 886 based on pretraining. In some embodiments, the GMM can be initialized with 17 components ($2^4+1$), and the learning rates for the weights and means, log-variances, and log-mixing proportions can all be initialized separately.

Following initialization of the GMM components, the joint optimization module 888 retrains the pretrained neural network model using the GMM. The joint optimization module 888 fits the initialized GMM over the weights of the pretrained neural network and runs an optimization algorithm to cluster the weights of the neural network around clusters of the GMM. For example, in some embodiments the following equation can be optimized via gradient descent:

$$L\left(w, \{\mu_j, \sigma_j, \pi_j\}_{j=0}^J\right) = -\log p(T|X, w) - \tau\log p\left(w, \{\mu_j, \sigma_j, \pi_j\}_{j=0}^J\right)$$

where w is the neural network model parameters (or weights), $\mu_j$, $\sigma_j$, $\pi_j$ are the means, variances, and mixture weights of the GMM, and X and T are the acoustic feature inputs and classification targets of the neural network. The loss decomposes into a term for the neural network, $p(T|X, w)$, and a term of the GMM, $p(w, \{\mu_j, \sigma_j, \pi_j\}_{j=0}^J)$, which are balanced using a weighting factor, $\tau$.

In some examples, the weighting factor t can be set to 0.005. To encourage sparsity and improve compression in the next stage, one component of the GMM can have a fixed mean $\mu_{j=0}=0$ and mixture weight $\pi_{j=0}=0.999$. The rest of the components are learned. Alternatively, the stage can also train $\pi_{j=0}$ as well but restrict it using a hyperprior such as a Beta distribution. After successive iterations, the function converges such that the weights of the neural network are clustered tightly around the clusters of the GMM.

In the joint optimization module 888, the gradient descent calculation can be highly sensitive to selected learning rates and parameters. If the learning rate is too high, the GMM may collapse too quickly and weights of the neural network may be left outside of any component and fail to cluster. If, conversely, the learning rate is too low, the mixture will converge too slowly. In some embodiments, the learning rate may be set to approximately $5\times10^{-4}$. In certain embodiments, an Inverse-Gamma hyperprior may be applied on the mixture variances to prevent the mixture components from collapsing too quickly.

At the final stage of the keyword selection and compression module 884, the quantization module 890 further compresses the model. For example, after the neural network has been retrained via the joint optimization module 888, each weight can be set to the mean of the component that takes most responsibility for it. This process is referred to as quantization. Before quantization, however, redundant components may be removed. In one example, a Kullback-Leibler (KL) divergence can be computed between all components, and for KL divergence smaller than a threshold, the two components can be merged to form a single component. After quantization, the resulting neural network has a significantly reduced number of distinct values across the weights compared to the pretrained neural network 882.

The output of the keyword selection and compression module 884 may then be subjected to post processing 892 (e.g., additional filtering, formatting, etc.) before being output to voice-input spotter 576. In some embodiments, post-processing can include compressed sparse row (CSR) representation, as described below with respect to FIG. 10. As described above with respect to FIGS. 5 and 7, the voice-input spotter 576 can be used to perform wake-word detection, for example to perform a preliminary wake-word detection analysis on captured sound data. Based on the output of this compressed neural network, a second wake-word detection process can be performed, for example utilizing a wake-word engine associated with a particular VAS or a particular set of wake words.

Additional details and examples of soft weight-shared neural networks, quantization, compressed sparse row representation, and the use of KL divergence can be found in Ulrich et al., "Soft Weight-Sharing for Neural Network Compression," available at https://arxiv.org/abs/1702.04008v2, Han et al., "Deep Compression: Compressing Deep Neural Networks with Pruning, Trained Quantization and Huffman Coding," available at https://arxiv.org/abs/1510.00149v5, and Han et al., "Learning both Weights and Connections for Efficient Neural Networks" available at https://arxiv.org/abs/1506.02626v3, each of which is hereby incorporated by reference in its entirety. Any of the techniques disclosed in the above-referenced papers may be incorporated in the keyword selection and compression module 804 and/or the post-processing 892 described above.

Figure 9:
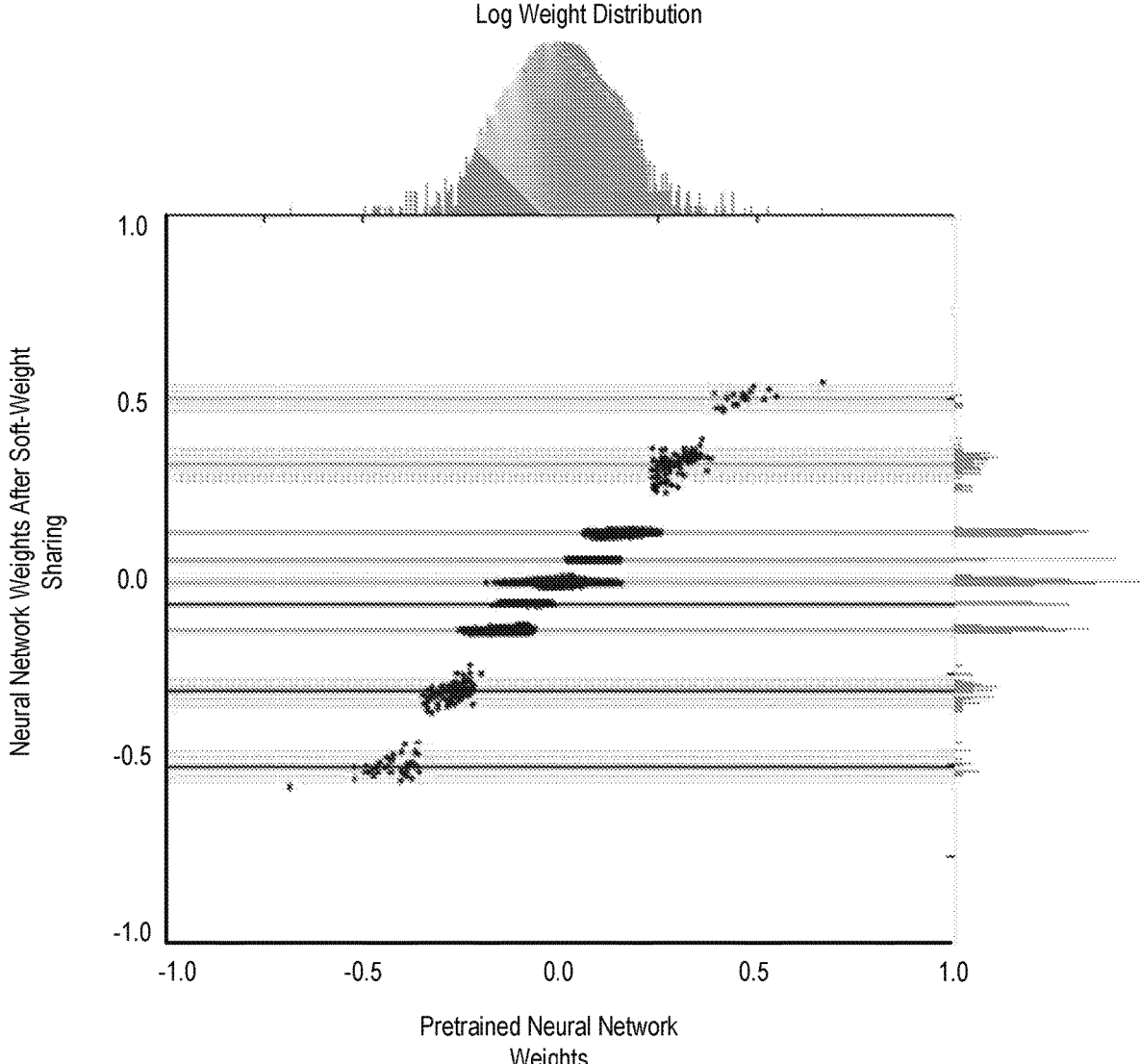
FIG. 9 is a chart illustrating the log weight distributions of weights for a neural network model before and after compression via soft-weight sharing in accordance with aspects of the disclosure.

FIG. 9 illustrates the log weight distributions of weights for a neural network before and after compression via soft-weight sharing. The histogram at the top of FIG. 9 shows the distribution of weights w of a pretrained neural network (e.g., the pretrained neural network 882 of FIG. 8). On the right the same distribution is shown after soft-weight sharing retraining has been performed (e.g., as reflected in the compressed neural network of the voice-input spotter 576). The change in value of each weight is illustrated by scatter plot. As shown, the weights are drawn together to cluster around discrete values, vastly reducing the number of distinct values across the weights in the soft-weight shared neural network compared to the pretrained neural network. Additionally, the greatest concentration of weights is at zero, thereby minimizing the number of non-zero weights in the resulting neural network. This allows for even greater compression using compressed sparse row representation (CSR) as described below with respect to FIG. 10. The reduction in distinct values across the weights achieved by soft-weight sharing, together with CSR (or other compressed representation of the weights), significantly decreases the size and computational complexity of the neural network without a material decrease in accuracy.

Figure 10:
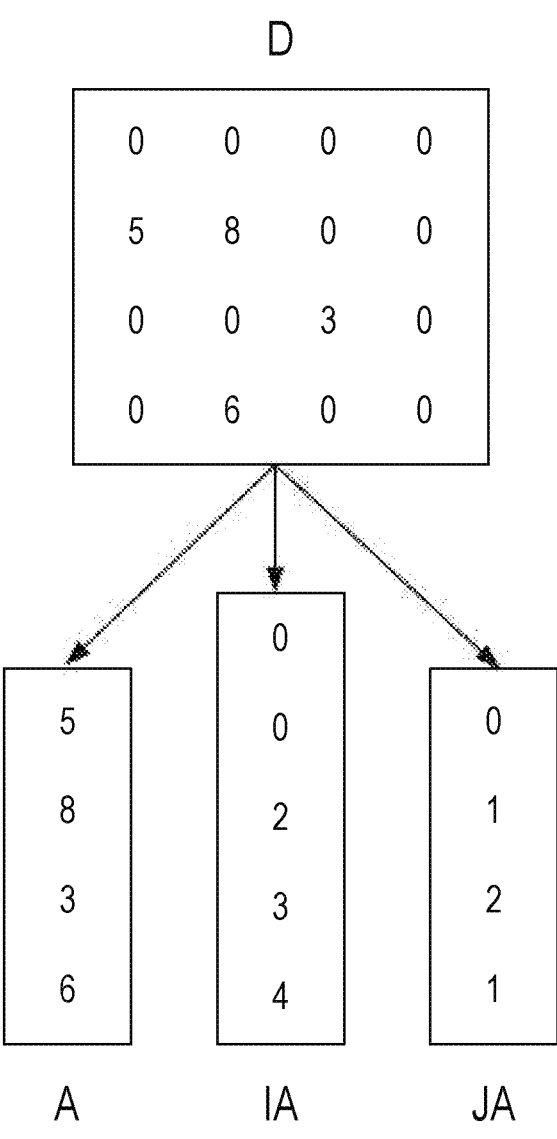
FIG. 10 illustrates an example of compressed sparse row representation of a neural network model in accordance with aspects of the disclosure.

FIG. 10 illustrates an example of compressed sparse row (CSR) representation of a neural network model. In addition to shared-weight clustering, neural network models can be further compressed using sparse representation. One example is standard CSR representation, in which a matrix M is represented by three one-dimensional arrays. In particular, in reference to FIG. 10, a matrix D can be represented by three one-dimensional arrays A, IA, and JA. Array A is obtained by taking the nonzero components (5, 8, 3, and 6) of matrix D. Array IA is obtained from the number of nonzero components in each row of matrix D, recursively, with an additional first value of 0. In matrix D, the number of nonzero components in each row is 0, 2, 1, and 1, respectively. Adding these recursively provides values of 0, 2 (0+2), 3 (2+1), and 4 (3+1), as reflected in array IA. Finally, array JA is generated from the column index of each nonzero value in matrix D. For example, the first nonzero value (5) is in column 0, the second nonzero value (8) is in column 1, the third nonzero value (3) is in column 2, and the fourth nonzero value (6) is in column 1. Accordingly, the array JA includes the values 0, 1, 2, 1. These three arrays can represent the matrix M in a compressed format, for example by reducing the total number of values that need to be stored to represent the neural network model. In the example of FIG. 10, matrix M has 16 values, while the three arrays A, IA, and JA have a combined total of 13 values.

Each of these arrays can be further optimized. For example, the largest number in array IA is the total number of nonzero elements in D, hence the numbers in array IA can be stored with lower precision. Array A can be optimized by quantizing with a codebook to indexes. And array JA can be optimized with lower precision indexes and/or to store differences.

In evaluating neural network models that have been compressed using CSR techniques, the inventor has found significant reductions in size from the baseline neural network. In one example with eight components, a baseline overall size of the neural network was 540 kB. After compressed sparse row representation, the size was reduced to 462.5 kB, reflecting an overall compression rate of 1.16. After optimization of the CSR arrays, the size was further reduced to 174 kB, reflecting an overall compression rate of 3.1. Accordingly, utilizing CSR representation in conjunction with optimization of the arrays was found to reduce the overall size by over two-thirds. These and other compression techniques can be used to reduce the size and/or computational complexity of the neural network model used to detect wake words as described above.

c. Examples of Multi-Stage Power Conservation in a Portable Playback Device

Figures 11A, 11B, 11C:
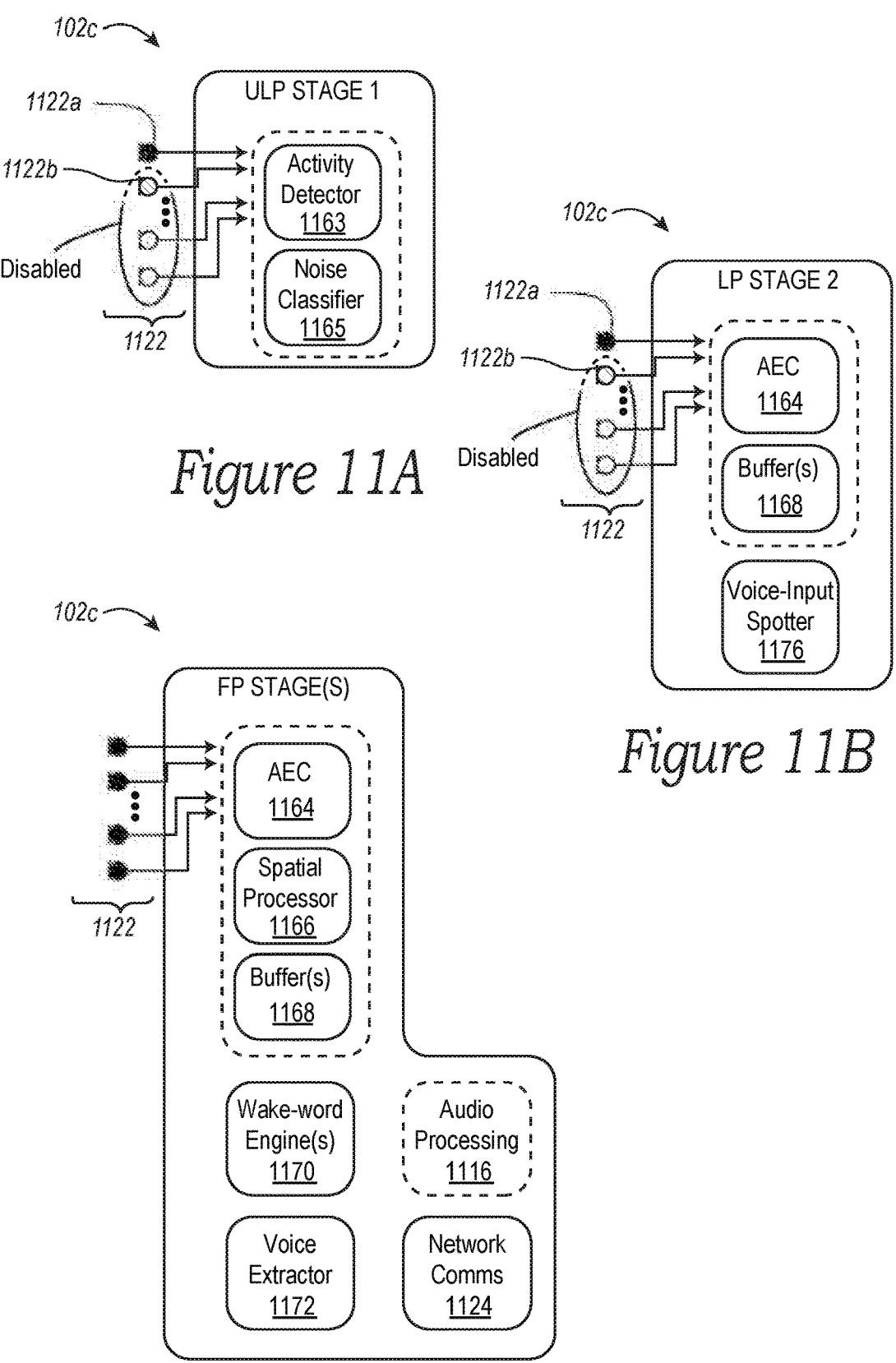
FIGS. 11A-11C are schematic diagrams showing a portable playback device in various stages of operation in accordance with aspects of the disclosure.

As noted above, in portable playback devices (e.g., battery-powered playback devices), keyword spotting can draw additional power from the device's battery, which reduces the amount of time that a portable device can operate before it needs to be recharged. In addition to components used for keyword spotting, other components that may draw additional power include microphones, voice capture components, network communication components (e.g., radio transceivers configured to communicate over a network interface), and audio processing components, among other components. FIGS. 11A-11C are schematic diagrams illustrating the portable playback device 102c in certain configurations, or stages, in which such components are enabled/disabled to conserve power during operation. A component that is enabled from a disabled state may be turned on, supplied power or additional power, taken out of standby or sleep state, or otherwise activated in such a way that the enabled component is allowed to draw more power than it could when disabled. Although described in the context of a portable playback device, it will be appreciated that a stationary playback device may be configured in a similar manner to reduce processing load and power consumption.

Referring first to FIG. 11A, the playback device 102c is in a first stage, or ultra-low-power stage, in which a limited number of components have been enabled. For instance, in FIG. 11A, a single microphone 1122a is enabled while other microphones 1122 are disabled. In some embodiments, one or more additional microphone(s) 1122b, but fewer than all of the microphones may be enabled. Also during the first stage, other components of the playback device 102c (not shown in FIG. 11A) may be disabled, such as DSP and application processors, among other components.

In addition to enabling certain microphone(s) during the first stage, the playback device 102c enables a voice-activity detector 1163 and a noise classifier 1165. In operation, the voice-activity detector 1163 can determine if a sound is detected by the enabled microphone(s) 1122 (using, e.g., a voice-activity detection algorithm, such as a voice activity detection algorithm that is less computationally intensive than the first algorithm of the voice-input spotter), and the noise classifier 1165 may classify the detected sound as being a detected sound of interest. For example, the noise classifier may detect if there is a spike in a signal-to-noise ratio in ambient sound detected by an enabled microphone. In any event, if there is a detected sound of interest, this causes the playback device 102c to proceed to a second stage, or low-power stage, to enable/disable additional components.

In addition or alternatively, the playback device 102c can determine whether to proceed from the first stage to the second stage based on whether a user is in proximity to the playback device 102c, as the detected presence of a user may correlate with an increased likelihood of the playback device 102c receiving voice input and the absence of a user may likewise correlate with a decreased likelihood of the playback device 102c receiving voice input. To facilitate determining whether a user is in proximity to the playback device 102c, the playback device 102c may include a proximity sensor or presence detector. For instance, the playback device 102c may include an optical or radio frequency proximity sensor that emits a signal into an environment of the playback device 102c and determines the presence of a user based on changes in the reflected signal. In some examples, the playback device 102c detects the presence of a user based on detecting network interference via a wireless network interface of the playback device 102c, such as by detecting interference with a Wi-Fi signal of the playback device 102c. In any case, responsive to detecting the presence of a user, the playback device 102c can proceed from the first stage to a second stage.

Referring to FIG. 11B, in the second stage, the playback device enables an AEC 1164, one or more buffers 1168, and a voice-input spotter 1176, which may operate in a manner similar to the AEC 564, buffer(s) 568, and voice-input spotters 576 discussed above. The playback device may also enable additional ones of the microphones 1122 and/or may continue to operate with fewer than all the microphones 1122 enabled, as shown in FIGS. 11A and 11B. During the second stage, the voice-input spotter 1176 may use algorithms that are less computationally intensive than a traditional wake-word engine, but typically less accurate at detecting keywords. In some embodiments, the voice-input spotter 1176 may leverage a neural network, as discussed above.

During the second stage, the voice-input spotter 1176 may monitor the detected sound from the limited number of enabled microphones 1122. Notably, a spatial processor 1166 (FIG. 11C) of the playback device 102c may be disabled during the second stage. Further, other components of the playback device 102 may remain disabled and/or be caused to become disabled (e.g., the voice activity detector 1163 and/or noise classifier 1165) during the second stage. In any event, if there is a wake word that is potentially spotted, this causes the playback device 102*c* to proceed to a third stage, or full-performance stage, to enable/disable additional components.

Referring to FIG. 11C, in the third stage, the playback device 102 enables the spatial processor 1166 and all the microphones 1122 to process the detected sound. The playback device 102*c* also enables a wake-word engine 1170 (and/or other appropriate voice-input identification engine (s)), which may correspond to a keyword that was spotted by the voice-input spotter 1176 (FIG. 11B) in the second stage. In some embodiments, the AEC 1164 may draw additional power in the third stage due to the higher performance demand from the additional microphones 1122.

During the third stage, the playback device 102*c* also enables a voice extractor 1172 and network communication components 1124 for transmitting potential voice input to a remote VAS (not shown). In some embodiments, the playback device may enable audio processing components during the third stage, such as readying one or more amplifiers, for outputting audio or other content. In other embodiments, the playback device may wait until a subsequent full-performance stage (not shown) to enable certain audio processing components, such as after confirming that a wake word was positively identified. Further, during the third stage or a subsequent full-performance stage, the playback device 102 may fully enable DSP and application processors.

If a wake word is not spotted during the third stage, the playback deice 102*c* may return to the first stage shown in FIG. 11A to conserve power. The playback device 102*c* may also return to the first stage if the device has been idle for a certain amount of time and/or in response to an instruction to enter a lower-power mode.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The present technology is illustrated, for example, according to various aspects described below. Various examples of aspects of the present technology are described as numbered examples (1, 2, 3, etc.) for convenience. These are provided as examples and do not limit the present technology. It is noted that any of the dependent examples may be combined in any combination, and placed into a respective independent example. The other examples can be presented in a similar manner.

The invention claimed is:

1. A network microphone device comprising:
   a communication interface;
   at least one microphone;
   at least one processor; and
   at least one tangible, non-transitory computer-readable medium comprising program instructions that are executable by the at least one processor such that the network microphone device is configured to:
   while the network microphone device is in a first stage of power consumption, detect an occurrence of an event;
   after detecting the occurrence of the event, transition the network microphone device from the first stage of power consumption to a second stage of power consumption, wherein the network microphone device draws more power in the second stage of power consumption than in the first stage of power consumption;
   while the network microphone device is in the second stage of power consumption, use a first algorithm implemented on the network microphone device to detect whether audio content captured by the at least one microphone may include a wake word;
   after detecting that the captured audio content may include the wake word, transition the network microphone device from the second stage of power consumption to a third stage of power consumption, wherein the network microphone device draws more power in the third stage of power consumption than in the second stage of power consumption;
   while the network microphone device is in the third stage of power consumption:
   activate logic implemented on the network microphone device and that is associated with one of a plurality of second algorithms that is particularly associated with the wake word to confirm whether the first algorithm detected the wake word in the captured audio content, wherein each of the plurality of second algorithms is associated with a different wake word;
   after the one of the plurality of second algorithms confirms that the first algorithm detected the wake word in the captured audio content, transmit, via the communication interface, at least a portion of the captured audio content to a voice service corresponding to the wake word; and
   after the portion of the captured audio content has been communicated to the voice service corresponding to the wake word, deactivate the logic associated with the one of the plurality of second algorithms, wherein the network microphone device at least temporarily remains in the third stage of power consumption following the deactivation of the logic associated with the one of the plurality of second algorithms.

2. The network microphone device of claim 1, further comprising program instructions that are executable by the at least one processor such that the network microphone device is configured to, when the one of the plurality of second algorithms does not confirm that the first algorithm detected the wake word in the captured audio content:

deactivate the logic associated with the one of the plurality of second algorithms to thereby cease further processing of the captured audio content; and transition the network microphone device from the third stage of power consumption to the first stage of power consumption.

3. The network microphone device of claim 1, wherein the program instructions that are executable by the at least one processor such that the network microphone device is configured to, while the network microphone device is in the first stage of power consumption, detect the occurrence of the event, comprise program instructions that are executable by the at least one processor such that the network microphone device is configured to detect that a user is in proximity to the network microphone device.

4. The network microphone device of claim 1, wherein the program instructions that are executable by the at least one processor such that the network microphone device is configured to, while the network microphone device is in the first stage of power consumption, detect the occurrence of the event, comprise program instructions that are executable by the at least one processor such that the network microphone device is configured to detect that the captured audio content comprises a sound of interest.

5. The network microphone device of claim 4, wherein the program instructions that are executable by the at least one processor such that the network microphone device is configured to detect that the captured audio content comprises a sound of interest, comprise program instructions that are executable by the at least one processor such that the network microphone device is configured to detect a spike in a signal-to-noise ratio in ambient sound in the captured audio content.

6. The network microphone device of claim 1, further comprising program instructions that are executable by the at least one processor such that the network microphone device is configured to, after the portion of the captured audio content has been communicated to the voice service corresponding to the wake word, transition the network microphone device from the third stage of power consumption to the first stage of power consumption following a length of time where the network microphone device has been idle.

7. The network microphone device of claim 1, further comprising program instructions that are executable by the at least one processor such that the network microphone device is configured to, after the portion of the captured audio content has been communicated to the voice service corresponding to the wake word, transition the network microphone device from the third stage of power consumption to the first stage of power consumption following receipt of an instruction to enter a low power mode.

8. A tangible, non-transitory, computer-readable media storing instructions executable by one or more processors to cause a network microphone device to perform operations comprising:

while the network microphone device is in a first stage of power consumption, detecting an occurrence of an event;

after detecting the occurrence of the event, transitioning the network microphone device from the first stage of power consumption to a second stage of power consumption, wherein the network microphone device draws more power in the second stage of power consumption than in the first stage of power consumption;

while the network microphone device is in the second stage of power consumption, using a first algorithm implemented on the network microphone device to detect whether audio content captured by at least one microphone of the network microphone device may include a wake word;

after detecting that the captured audio content may include the wake word, transitioning the network microphone device from the second stage of power consumption to a third stage of power consumption, wherein the network microphone device draws more power in the third stage of power consumption than in the second stage of power consumption;

while the network microphone device is in the third stage of power consumption:

activating logic implemented on the network microphone device and that is associated with one of a plurality of second algorithms that is particularly associated with the wake word to confirm whether the first algorithm detected the wake word in the captured audio content, wherein each of the plurality of second algorithms is associated with a different wake word;

after the one of the plurality of second algorithms confirms that the first algorithm detected the wake word in the captured audio content, transmitting, via a communication interface of the network microphone device, at least a portion of the captured audio content to a voice service corresponding to the wake word; and after the portion of the captured audio content has been communicated to the voice service corresponding to the wake word, deactivating the logic associated with the one of the plurality of second algorithms, wherein the network microphone device at least temporarily remains in the third stage of power consumption following the deactivation of the logic associated with the one of the plurality of second algorithms.

9. The tangible, non-transitory, computer-readable media of claim 8, the operations further comprising, when the one of the plurality of second algorithms does not confirm that the first algorithm detected the wake word in the captured audio content:

deactivating the logic associated with the one of the plurality of second algorithms to thereby cease further processing of the captured audio content; and transitioning the network microphone device from the third stage of power consumption to the first stage of power consumption.

10. The tangible, non-transitory, computer-readable media of claim 8, wherein detecting the occurrence of the event comprises detecting that a user is in proximity to the network microphone device.

11. The tangible, non-transitory, computer-readable media of claim 8, wherein detecting the occurrence of the event comprises detecting that the captured audio content comprises a sound of interest.

12. The tangible, non-transitory, computer-readable media of claim 11, wherein detecting that the captured audio content comprises the sound of interest comprises detecting a spike in a signal-to-noise ratio in ambient sound in the captured audio content.

13. The tangible, non-transitory, computer-readable media of claim 8, the operations further comprising, after the portion of the captured audio content has been communicated to the voice service corresponding to the wake word, transitioning the network microphone device from the third stage of power consumption to the first stage of power consumption following a length of time where the network microphone device has been idle.

14. The tangible, non-transitory, computer-readable media of claim 8, the operations further comprising, after the portion of the captured audio content has been communicated to the voice service corresponding to the wake word, transitioning the network microphone device from the third stage of power consumption to the first stage of power consumption following receipt of an instruction to enter a low power mode.

15. A method comprising:

while a network microphone device is in a first stage of power consumption, detecting an occurrence of an event;

after detecting the occurrence of the event, transitioning the network microphone device from the first stage of power consumption to a second stage of power consumption, wherein the network microphone device draws more power in the second stage of power consumption than in the first stage of power consumption;

while the network microphone device is in the second stage of power consumption, using a first algorithm implemented on the network microphone device to detect whether audio content captured by at least one microphone of the network microphone device may include a wake word;

after detecting that the captured audio content may include the wake word, transitioning the network microphone device from the second stage of power consumption to a third stage of power consumption, wherein the network microphone device draws more power in the third stage of power consumption than in the second stage of power consumption;

while the network microphone device is in the third stage of power consumption:

activating logic implemented on the network microphone device and that is associated with one of a plurality of second algorithms that is particularly associated with the wake word to confirm whether the first algorithm detected the wake word in the captured audio content, wherein each of the plurality of second algorithms is associated with a different wake word;

after the one of the second algorithms confirms that the first algorithm detected the wake word in the captured audio content, transmitting, via a communication interface of the network microphone device, at least a portion of the captured audio content to a voice service corresponding to the wake word; and after the portion of the captured audio content has been communicated to the voice service corresponding to the wake word, deactivating the logic associated with the one of the plurality of second algorithms, wherein the network microphone device at least temporarily remains in the third stage of power consumption following the deactivation of the logic associated with the one of the plurality of second algorithms.

16. The method of claim 15, further comprising, when the one of the plurality of second algorithms does not confirm that the first algorithm detected the wake word in the captured audio content:

deactivating the logic associated with the one of the plurality of second algorithms to thereby cease further processing of the captured audio content; and transitioning the network microphone device from the third stage of power consumption to the first stage of power consumption.

17. The method of claim 15, wherein detecting the occurrence of the event comprises detecting that a user is in proximity to the network microphone device.

18. The method of claim 15, wherein detecting the occurrence of the event comprises detecting that the captured audio content comprises a sound of interest.

19. The method of claim 18, wherein detecting that the captured audio content comprises the sound of interest comprises detecting a spike in a signal-to-noise ratio in ambient sound in the captured audio content.

20. The method of claim 15, further comprising, after the portion of the captured audio content has been communicated to the voice service corresponding to the wake word, transitioning the network microphone device from the third stage of power consumption to the first stage of power consumption following a length of time where the network microphone device has been idle.

* * * * *